US008942665B2

(12) United States Patent
Patel

(10) Patent No.: US 8,942,665 B2
(45) Date of Patent: Jan. 27, 2015

(54) ENHANCEMENTS TO IP MULTIMEDIA SUBSYSTEMS (IMS) EMERGENCY SERVICES ARCHITECTURE

(75) Inventor: Milan Patel, Harrow (GB)

(73) Assignee: InterDigital Patent Holding, Inc., Wilmington, DE (US)

( * ) Notice: Subject to any disclaimer, the term of this patent is extended or adjusted under 35 U.S.C. 154(b) by 251 days.

(21) Appl. No.: 13/078,434

(22) Filed: Apr. 1, 2011

(65) Prior Publication Data
US 2012/0083240 A1 Apr. 5, 2012

Related U.S. Application Data

(60) Provisional application No. 61/320,554, filed on Apr. 2, 2010.

(51) Int. Cl.
H04M 11/04 (2006.01)
H04W 4/22 (2009.01)
H04W 76/00 (2009.01)
H04L 29/06 (2006.01)

(52) U.S. Cl.
CPC .............. H04W 4/22 (2013.01); H04W 76/007 (2013.01); H04L 65/1069 (2013.01); H04L 65/40 (2013.01)
USPC ................................. 455/404.2; 455/404.1

(58) Field of Classification Search
CPC .............................. H04W 4/22; H04W 76/007
USPC ............................. 455/404.1, 404.2
See application file for complete search history.

(56) References Cited

U.S. PATENT DOCUMENTS

2003/0206536 A1* 11/2003 Maggenti ....................... 370/328
2009/0310758 A1* 12/2009 Tuohino et al. ................ 379/37

FOREIGN PATENT DOCUMENTS

WO      WO 03/009627 A1      1/2003

OTHER PUBLICATIONS

3rd Generation Partnership Project (3GPP), S2-096693, "Alternative emergency session handling in the non-roaming case", Deutsche Telekom, France Telecom, 3GPP TSG-SA WG2 Meeting #76, S2-096693, Nov. 16-20, 2009, 9 pages.
3rd Generation Partnership Project; TS 23.167 V9.2.0, "3rd Generation Partnership Project; Technical Specification Group Services and System Aspects; IP Multimedia Subsystem (IMS) emergency sessions (Release 9)", Sep. 2009, 38 pages.

* cited by examiner

Primary Examiner — Kiet Doan
Assistant Examiner — Dung Lam
(74) Attorney, Agent, or Firm — Condo Roccia Koptiw LLP

(57) ABSTRACT

Embodiments contemplate methods and systems that may route an emergency call from an enterprise user and/or a user in a private number plan, or an emergency call that may be initiated by a service on behalf of the user. Architectural extensions to the IMS emergency services architecture may allow an emergency call to be handled in a home network or a local network in which the user may be visiting (e.g., roaming) such that appropriate public safety systems may be apprised of the emergency communication.

6 Claims, 23 Drawing Sheets

ENHANCEMENTS TO IP MULTIMEDIA SUBSYSTEMS (IMS) EMERGENCY SERVICES ARCHITECTURE

CROSS REFERENCE TO RELATED APPLICATIONS

This application claims the benefit of U.S. Provisional Application No. 61/320,554, filed Apr. 2, 2010, titled "ENHANCEMENTS TO IMS EMERGENCY SERVICES ARCHITECTURE", the contents of which is hereby incorporated by reference herein in its entirety, for all purposes.

BACKGROUND

Users of mobile devices, cell phones for example, may need to make a call in emergency situations. A wireless communication network may identify emergency calls and may route emergency calls to public safety communication systems that may be associated with the wireless communication network.

Cell phone users may need to make emergency calls when they are either in a "home" communication network or when the user may be "roaming" and may be proximate to another, "local" or "visited", communication network. However, while the cell phone user is roaming, an emergency call sent from the user's cell phone may not be routed to a public safety system that is associated with the local (or visited) communication network. Thus, the appropriate emergency responders who are located in or near the user's current location may not receive notification in a timely manner.

Therefore, a user may be unable to contact local public safety systems with an emergency call from a cell phone or wireless mobile device using a communication network that may be unable to determine if the user is roaming in a local or visited communication network or in their home communication network.

SUMMARY

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Embodiments contemplate that methods and systems may provide capability that may support one or more emergency sessions, such as IMS emergency sessions, that may be initiated by a service when requested by the user, for example by an Application Server on behalf of the user.

Embodiments contemplate methods and systems that may provide the ability to support emergency sessions, such as IMS emergency sessions, which may be initiated using a private numbering plan or from hosted enterprises.

Embodiments contemplate architectural enhancements to an IMS emergency services architecture that may handle emergency calls which may be initiated by a service on behalf of a user, and emergency calls that may be initiated by a user in a private numbering plan such as a hosted enterprise user.

Embodiments contemplate methods and systems that may route an emergency call from an enterprise user/user in a private number plan or an emergency call initiated by a service on behalf of the user. Architectural extensions to the IMS emergency services architecture may allow an emergency call to be handled in the home network or a local (or visited) network such that appropriate public safety systems may be apprised of the emergency call.

Embodiments contemplate interfaces that may support emergency call handling in a home network or a local network such as, but not limited to, Application Server/Emergency Call Session Control Function; Serving Call Session Control Function/Emergency Call Session Control Function; Interrogating Call Session Control Function/Emergency Call Session Control Function; and Emergency Call Session Control Function/Interconnection Border Control Function, among others.

Embodiments contemplate that a first device, which may be in communication with a communication network, may be configured, at least in part, to receive a message indicative of an emergency; and, to forward the message to a second device. Embodiments contemplate that the second device may be in communication with the communication network. Embodiments also contemplate that the first device may include a serving call session control function (S-CSCF), and the second device may include an emergency call session control function (E-CSCF). Embodiments further contemplate that the first device may receive the message from a third device which may include a proxy call session control function (P-CSCF). The P-CSCF may receive the message from a wireless transmit/receive unit (WTRU)

Embodiments contemplate that a first device that may be in communication with a communication network and may include an application server (AS). The first device may be configured, at least in part to receive a message indicative of an emergency from a wireless transmit/receive unit (WTRU) and to forward the message to a second device. Embodiments contemplate that the second device may be in communication with the communication network. Embodiments contemplate that the first device may be further configured to identify the message as an emergency communication. Embodiments also contemplate that the first device may be further configured to forward the identified emergency communication to the second device on behalf of the WTRU.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
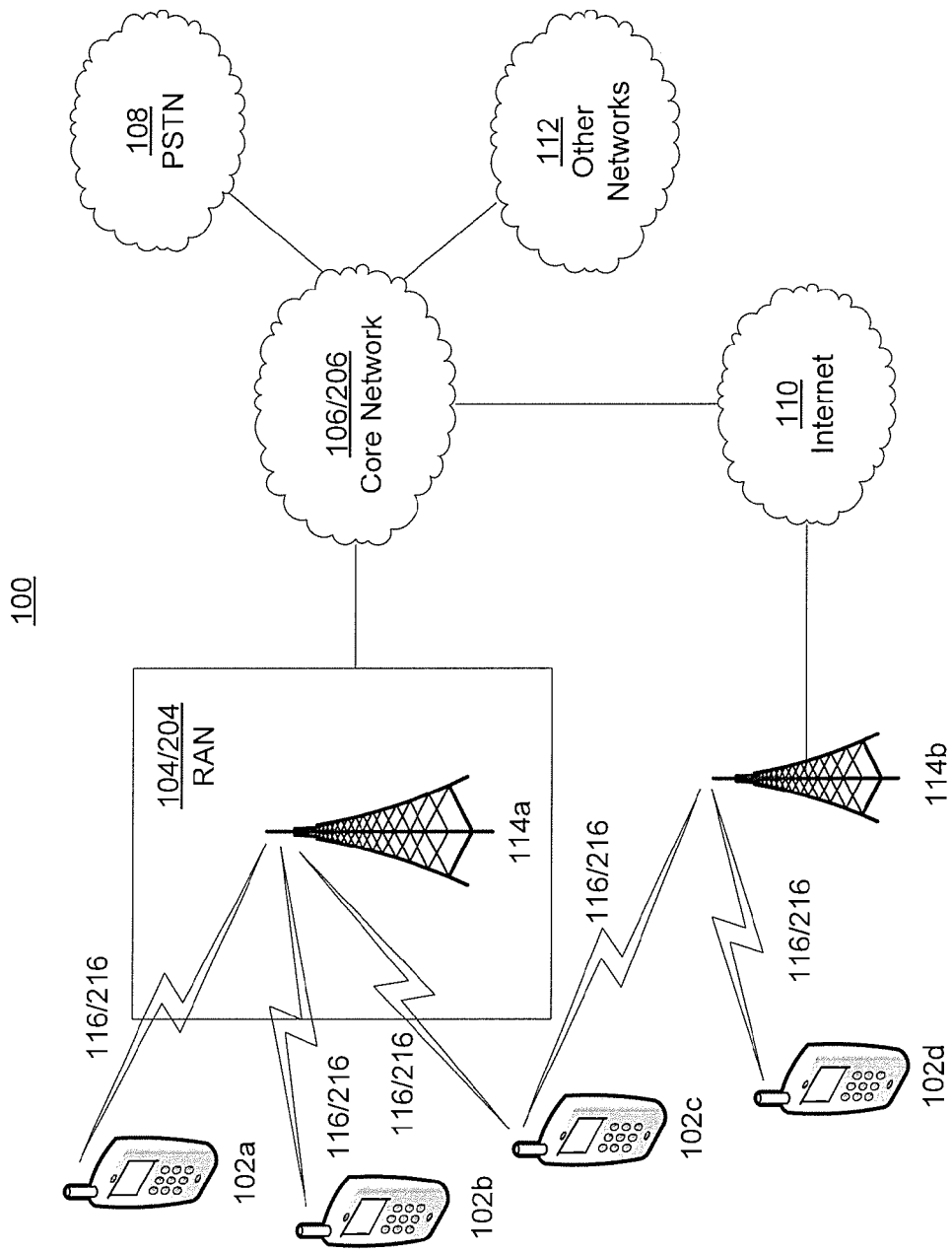
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104/204, a core network 106/206, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/206, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/204, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116/216, which may be any suitable wireless communication link (e.g., radio frequency (RF), microwave, infrared (IR), ultraviolet (UV), visible light, etc.). The air interface 116/216 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/204 and the WTRUs 102a, 102b, 102c may implement a radio technology such as Universal Mobile Telecommunications System (UMTS) Terrestrial Radio Access (UTRA), which may establish the air interface 116/216 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/206.

The RAN 104/204 may be in communication with the core network 106/206, which may be any type of network configured to provide voice, data, applications, and/or voice over internet protocol (VoIP) services to one or more of the WTRUs 102a, 102b, 102c, 102d. For example, the core network 106/206 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/204 and/or the core network 106/206 may be in direct or indirect communication with other RANs that employ the same RAT as the RAN 104/204 or a different RAT. For example, in addition to being connected to the RAN 104/204, which may be utilizing an E-UTRA radio technology, the core network 106/206 may also be in communication with another RAN (not shown) employing a GSM radio technology.

The core network 106/206 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104/204 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
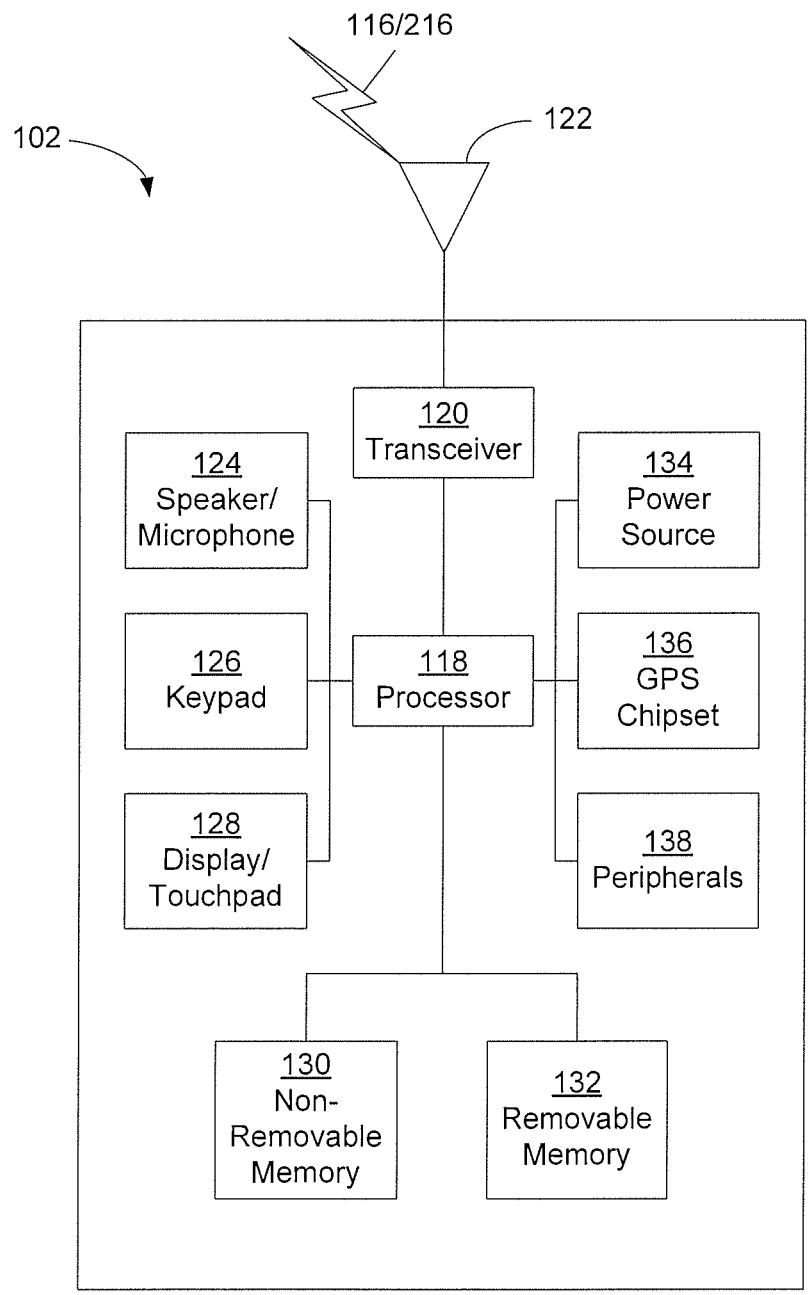
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116/216. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116/216.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116/216 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
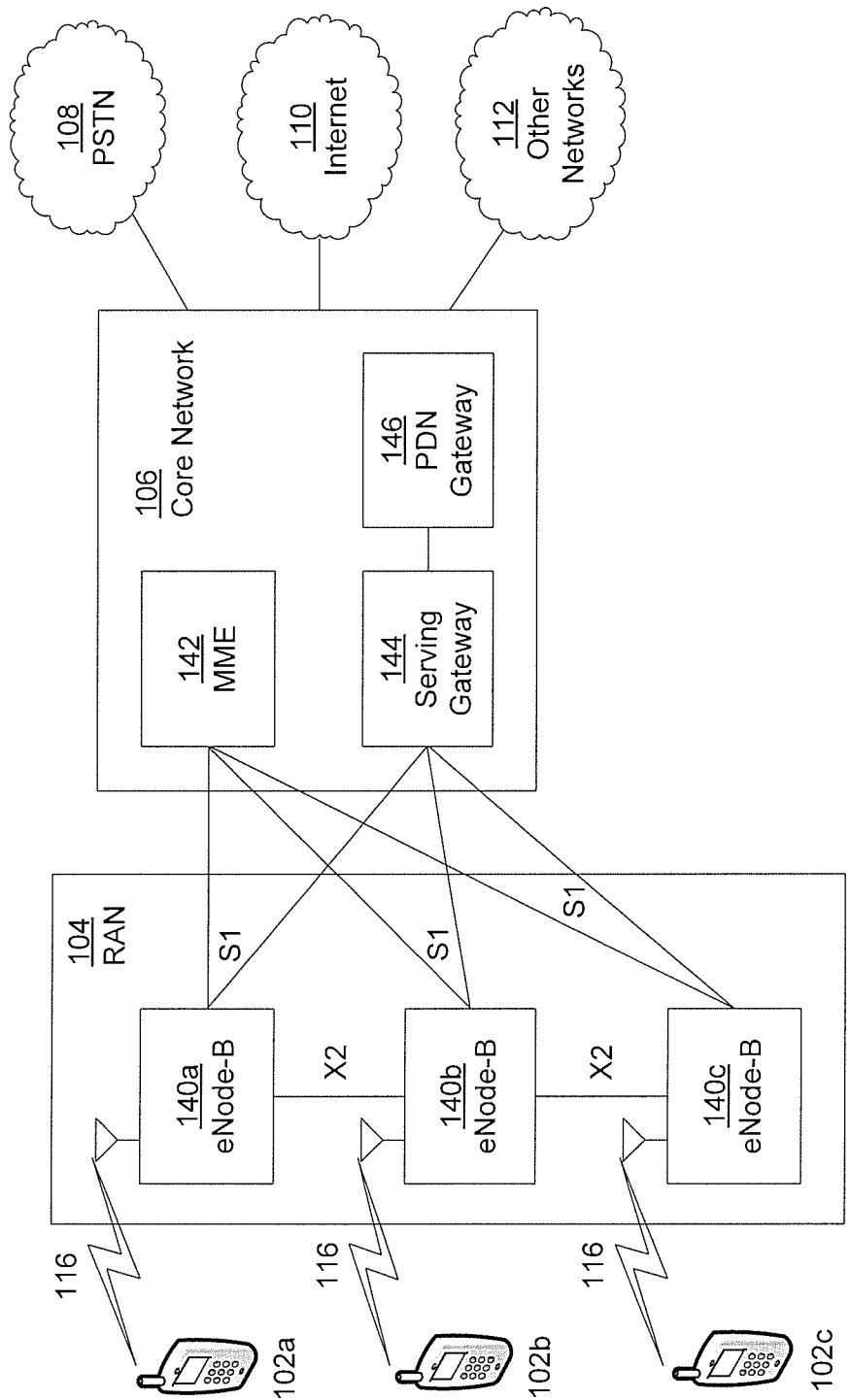
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and/or 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and/or 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1D:
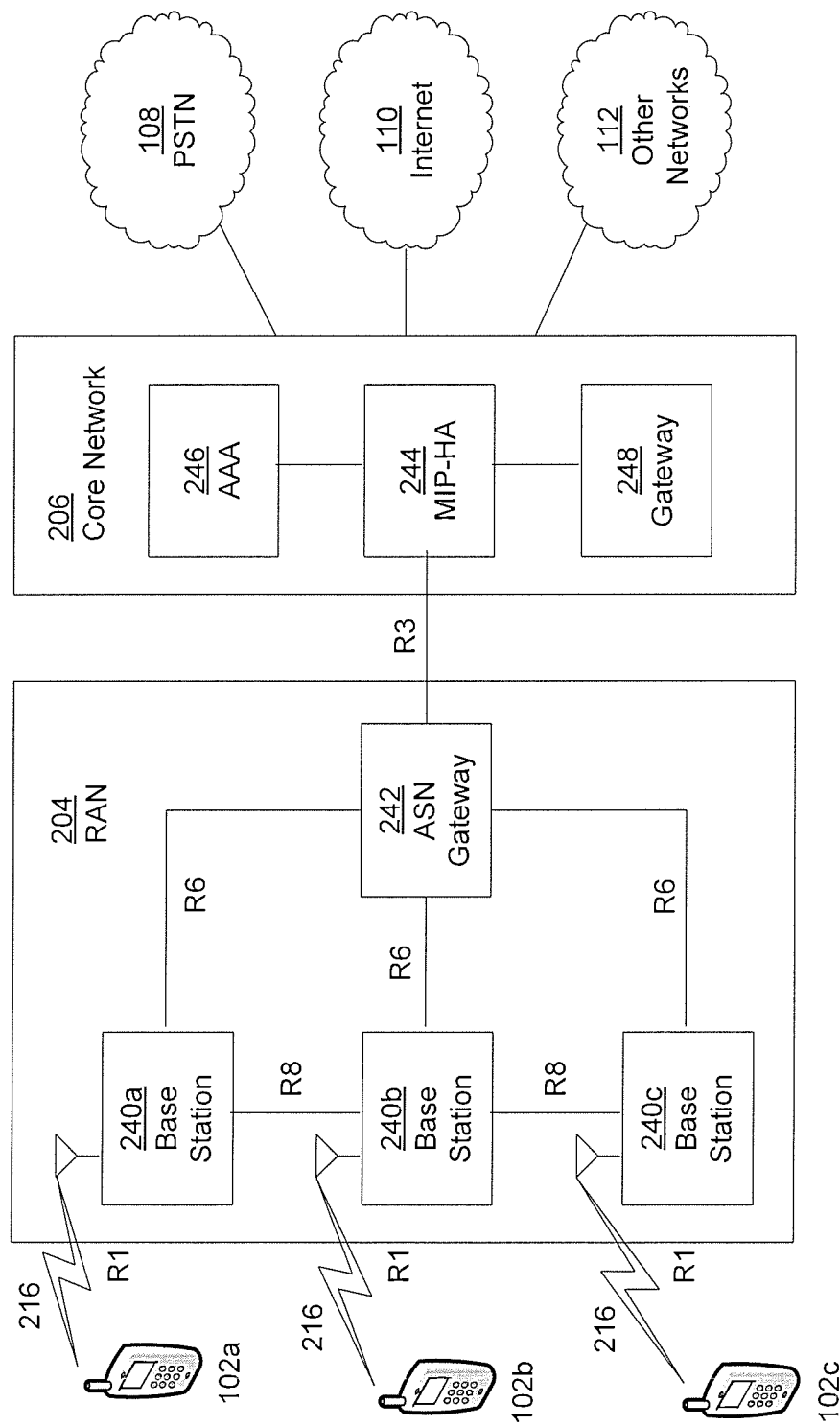
FIG. 1D is a system diagram of an example radio access network and an example core network that may be used within the communications system illustrated in FIG. 1A.

FIG. 1D is a system diagram of the RAN 204 and the core network 206 according to an embodiment. The RAN 204 may be an access service network (ASN) that employs IEEE 802.16 radio technology to communicate with the WTRUs 102a, 102b, and 102c over the air interface 216. As will be further discussed below, the communication links between the different functional entities of the WTRUs 102a, 102b, 102c, the RAN 204, and the core network 206 may be defined as reference points.

As shown in FIG. 1D, the RAN 204 may include base stations 240a, 240b, 240c, and an ASN gateway 242, though it will be appreciated that the RAN 204 may include any number of base stations and ASN gateways while remaining consistent with an embodiment. The base stations 240a, 240b, 240c may each be associated with a particular cell (not shown) in the RAN 204 and may each include one or more transceivers for communicating with the WTRUs 102a, 102b, 102c over the air interface 216. In one embodiment, the base stations 240a, 240b, 240c may implement MIMO technology. Thus, the base station 240a, for example, may use multiple antennas to transmit wireless signals to, and receive wireless signals from, the WTRU 102a. The base stations

240a, 240b, 240c may also provide mobility management functions, such as handoff triggering, tunnel establishment, radio resource management, traffic classification, quality of service (QoS) policy enforcement, and the like. The ASN gateway 242 may serve as a traffic aggregation point and may be responsible for paging, caching of subscriber profiles, routing to the core network 206, and the like.

The air interface 216 between the WTRUs 102a, 102b, 102c and the RAN 204 may be defined as an R1 reference point that implements the IEEE 802.16 specification. In addition, each of the WTRUs 102a, 102b, and 102c may establish a logical interface (not shown) with the core network 206. The logical interface between the WTRUs 102a, 102b, 102c and the core network 206 may be defined as an R2 reference point, which may be used for authentication, authorization, IP host configuration management, and/or mobility management.

The communication link between each of the base stations 240a, 240b, 240c may be defined as an R8 reference point that includes protocols for facilitating WTRU handovers and the transfer of data between base stations. The communication link between the base stations 240a, 240b, 240c and the ASN gateway 242 may be defined as an R6 reference point. The R6 reference point may include protocols for facilitating mobility management based on mobility events associated with each of the WTRUs 102a, 102b, 100c.

As shown in FIG. 1D, the RAN 204 may be connected to the core network 206. The communication link between the RAN 204 and the core network 206 may defined as an R3 reference point that includes protocols for facilitating data transfer and mobility management capabilities, for example. The core network 206 may include a mobile IP home agent (MIP-HA) 244, an authentication, authorization, accounting (AAA) server 246, and a gateway 248. While each of the foregoing elements are depicted as part of the core network 206, it will be appreciated that any one of these elements may be owned and/or operated by an entity other than the core network operator.

The MIP-HA 244 may be responsible for IP address management, and may enable the WTRUs 102a, 102b, 102c to roam between different ASNs and/or different core networks. The MIP-HA 244 may provide the WTRUs 102a, 102b, 102c with access to packet-switched networks, such as the Internet 110, to facilitate communications between the WTRUs 102a, 102b, 102c and IP-enabled devices. The AAA server 246 may be responsible for user authentication and for supporting user services. The gateway 248 may facilitate interworking with other networks. For example, the gateway 248 may provide the WTRUs 102a, 102b, 102c with access to circuit-switched networks, such as the PSTN 108, to facilitate communications between the WTRUs 102a, 102b, 102c and traditional land-line communications devices. In addition, the gateway 248 may provide the WTRUs 102a, 102b, 102c with access to the networks 112, which may include other wired or wireless networks that are owned and/or operated by other service providers.

Although not shown in FIG. 1D, it will be appreciated that the RAN 204 may be connected to other ASNs and the core network 206 may be connected to other core networks. The communication link between the RAN 204 the other ASNs may be defined as an R4 reference point, which may include protocols for coordinating the mobility of the WTRUs 102a, 102b, 102c between the RAN 204 and the other ASNs. The communication link between the core network 206 and the other core networks may be defined as an R5 reference, which may include protocols for facilitating interworking between home core networks and visited core networks.

When referred to hereafter, the terminology "wireless transmit/receive unit (WTRU)" includes but is not limited to a user equipment (UE), a mobile station, a station (STA), a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Figure 2:
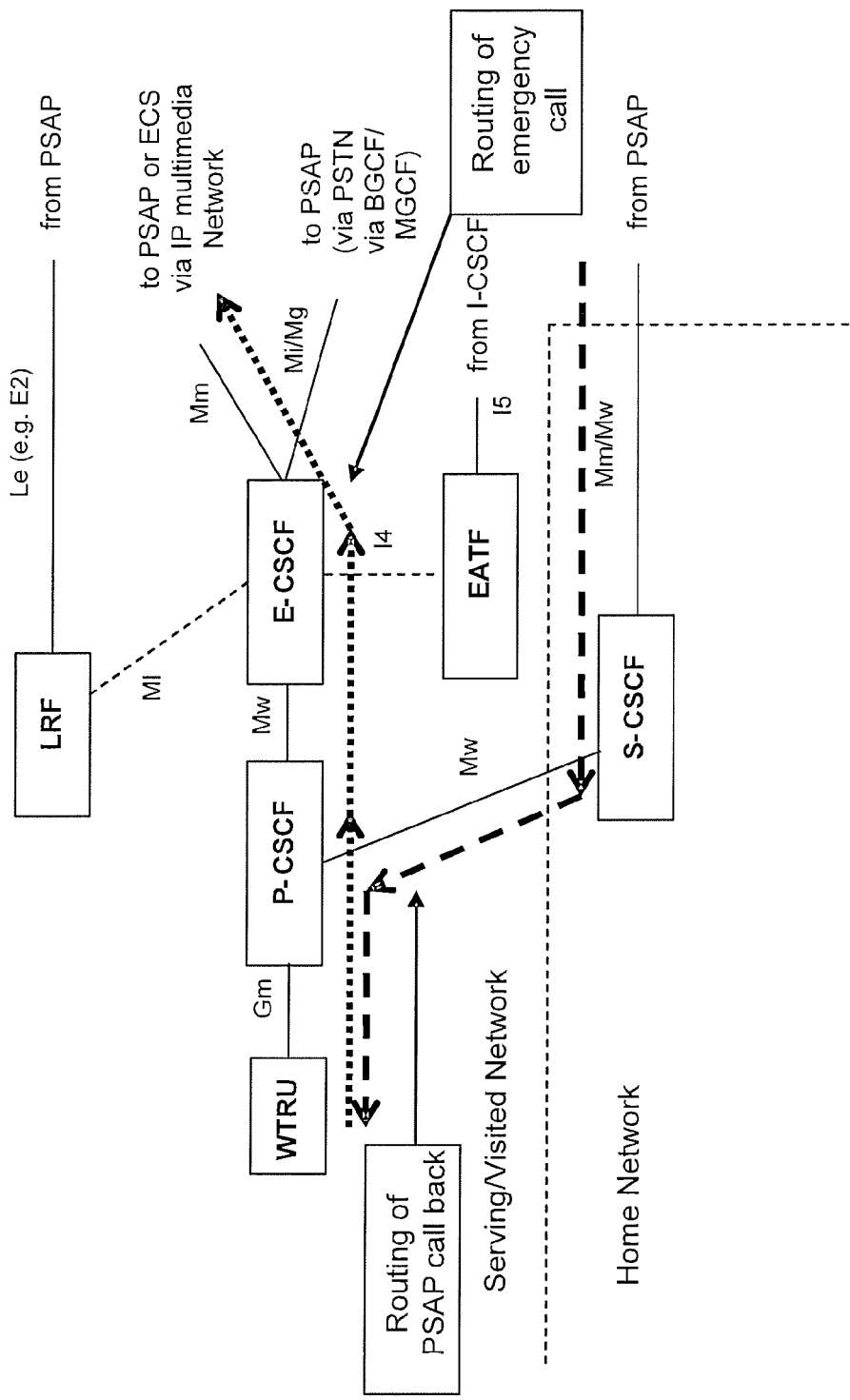
FIG. 2 illustrates an architecture diagram of an emergency services system for handling emergency calls consistent with embodiments.

FIG. 2 illustrates an IMS emergency architecture embodiment that may process emergency calls. Referring to FIG. 2, a Location Retrieval Function (LRF) may retrieve location information of the WTRU, which may initiate the emergency call (an emergency session). Locating the WTRU (or UE) may include a Routing Determination Function (RDF) (not shown) and a Location Server (not shown). The RDF may be used to provide an Emergency Call Session Control Function (E-CSCF) with routing information to route the call to a Public Safety Answering Point (PSAP) (not shown). The LRF may communicate with the E-CSCF via an MI interface. The E-CSCF may communicate with the PSAP or an Emergency Call Server (ECS) via an Mm interface. The E-CSCF may communicate with the PSAP via an Mi/Mg interface, perhaps also via a PSTN and/or interworking gateways, such as but not limited to a Breakout Gateway Control Function (BGCF) and/or a Media Gateway Control Function (MGCF). For example, an MGCF may effectively translate Integrated Service Digital Network (ISDN) User Part (ISUP) to Session Initiation Protocol (SIP) and vice versa, in addition to controlling a Media Gateway. The BGCF may make routing decisions and may perform MGCF selection if break out to PSTN is required, for example.

The WTRU may communicate with a PROXY Call Session Control Function (P-CSCF) via a Gm interface. The P-CSCF may communicate with the E-CSCF via an Mw interface. The P-CSCF may communicate with a Serving Call Session Control Function (S-CSCF) via an Mw interface. The S-CSCF may communicate may communicate with the PSAP via an Mm/Mw interface. An Emergency Service Query Key (ESQK) (not shown) may allow the PSAP to subsequently query LRF via an Le interface. An Emergency Access Transfer Function (EATF) may provide the procedures and functions for IMS emergency session anchoring and Packet Switched (PS) to Circuit Switched (CS) Access Transfer. The EATF may communicate with an Interrogating Call Session Control Function (I-CSCF) via an I5 interface and the EATF may communicate with the E-CSCF via an I4 interface.

Figure 3:
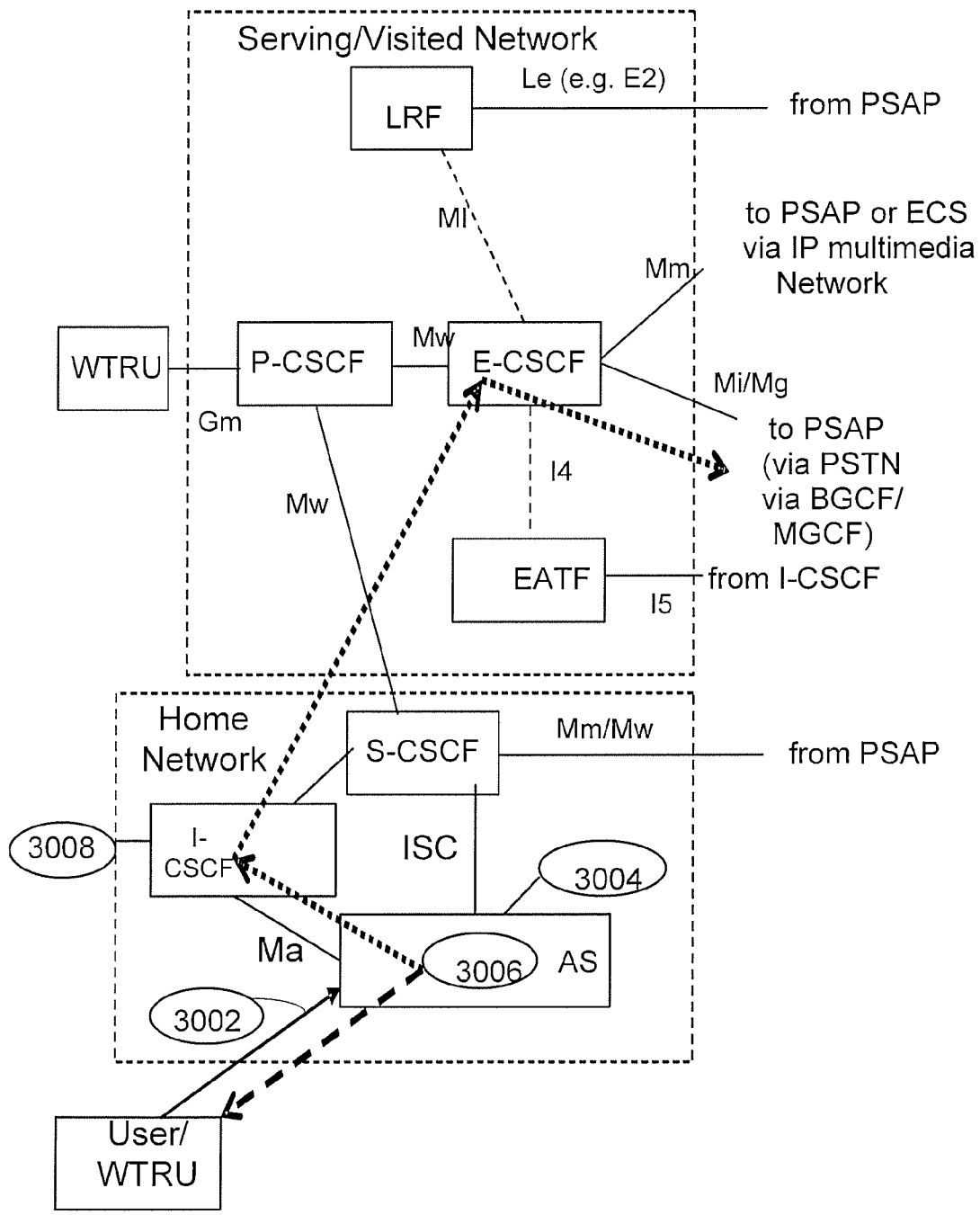
FIG. 3 illustrates a network architecture for handling emergency calls initiated by services consistent with embodiments.

FIG. 3 illustrates another embodiment of an IMS emergency services enabled network. Referring to FIG. 3, at 3002, the User or WTRU may, via some mechanism (such as through IMS, web portal, client), interact with Application Server (AS) with a click to call service, for example. At 3004, the AS may receive a stimulus to initiate an emergency call, perhaps on behalf of the user. For purposes of example, and not limitation, the stimulus may be a click to call 3rd party call control. At 3006, the AS may use 3rd party call control to initiate one or more call legs to the User/WTRU (via IMS CSCFs for example) and/or towards the PSAP (for example, via one or more Emergency CSCF (E-CSCF) and/or one or more Interrogating CSCF (I-CSCF)). At 3008, the Interrogation and/or Serving (I-CSFC and/or S-CSFC) nodes may be configured to decide whether the emergency call can be handled in the home network or may need to be re-routed to a local network. In addition to the interfaces described with regard to FIG. 2, embodiments contemplate that the I-CSCF may communicate with the AS via an Ma interface and that the AS may communicate with the S-CSCF via an ISC interface, for example. Embodiments contemplate that the serving/visiting network and home network may be the same where the user is located in the geographical area served by the home network.

Figure 4:
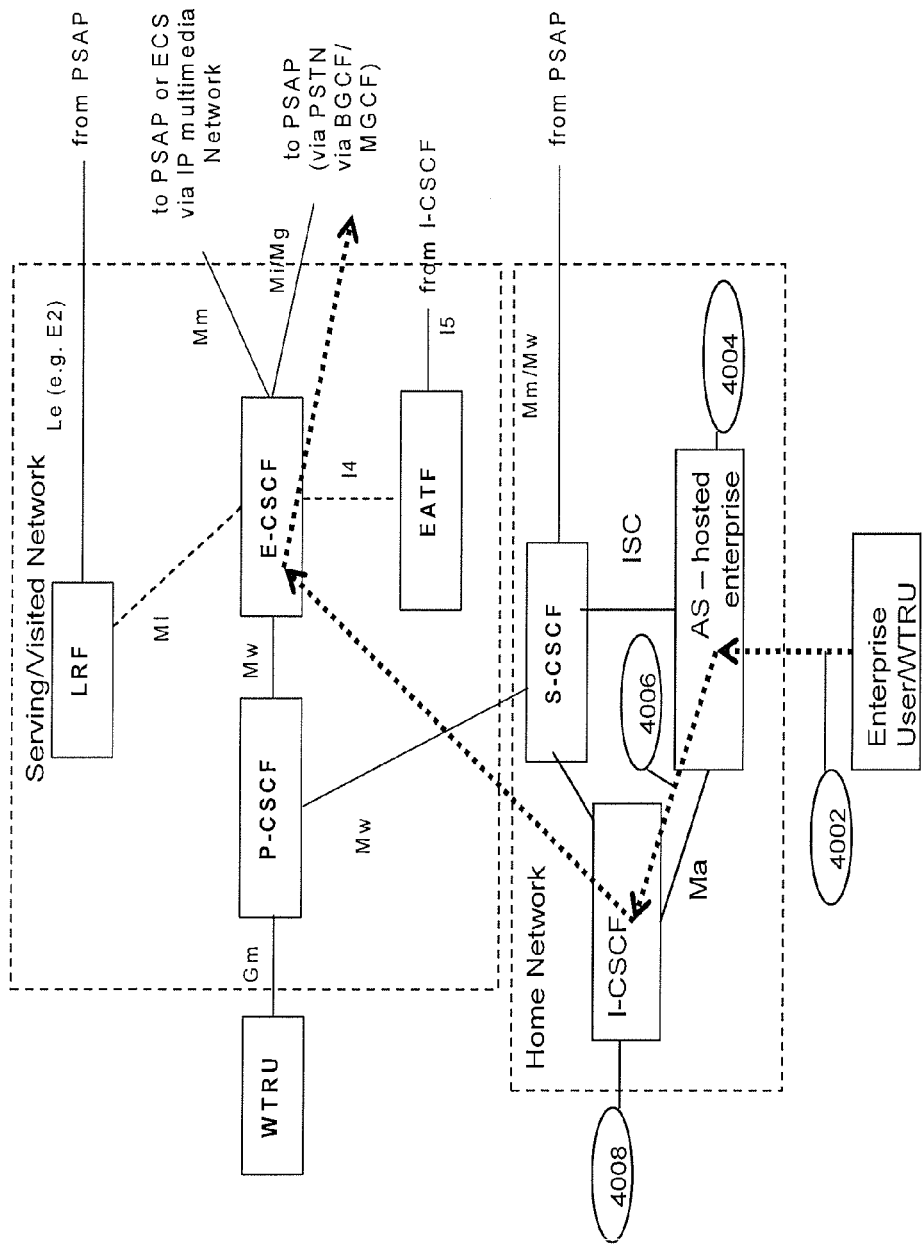
FIG. 4 illustrates an example embodiment of a network architecture for handling emergency calls initiated by a hosted enterprise consistent with embodiments.

FIG. 4 illustrates another embodiment of an IMS emergency services enabled network. In FIG. 4, the AS may be a hosted enterprise. At 4002, an enterprise WTRU (or UE), for example, may initiate an emergency call which may be routed via the IMS CSCFs (I-CSCF and/or S-CSCF, not all shown) to the AS. At 4004, the AS may perform some or all translations, as may be or if necessary, on a calling party address and, where necessary or useful, may also perform some or all translation on the dialed emergency number. At 4006, the call may be routed towards the PSAP (for example, via one or more Emergency CSCF (E-CSCF) and/or one or more Interrogating CSCF (I-CSCF)). At 4008, the Interrogation and/or Serving (I-CSCF and/or S-CSCF) nodes may be configured to decide whether the emergency call can be handled in the home network or may need to be re-routed to a local network. Embodiments contemplate that the serving/visiting network and home network may be the same where the user is located in the geographical area served by the home network.

Embodiments contemplate that emergency calls that may be either initiated by a service or initiated from an enterprise (hosted) user may require standardized interfaces. For purposes of example, and not limitation, interfaces between the Application Server (AS) and the Emergency CSCF (E-CSCF) and/or the Interrogating CSCF (I-CSCF) and the E-CSCF may be standardized, among others. As described previously, embodiments contemplate that, should the user be geographically located outside of the jurisdiction (e.g., operationally and/or contractually delimited service area) of the home network (e.g., in a visited communicated network), then the emergency call may need to be handled by another network "local" to the user. Embodiments contemplate that should the user (WTRU or UE)) be outside the home network, then routing emergency call across network boundaries may be necessary or useful. Analysis of location and resolution of emergency service request and location may be useful in the home network or hosted enterprise node, or both.

Figure 5:
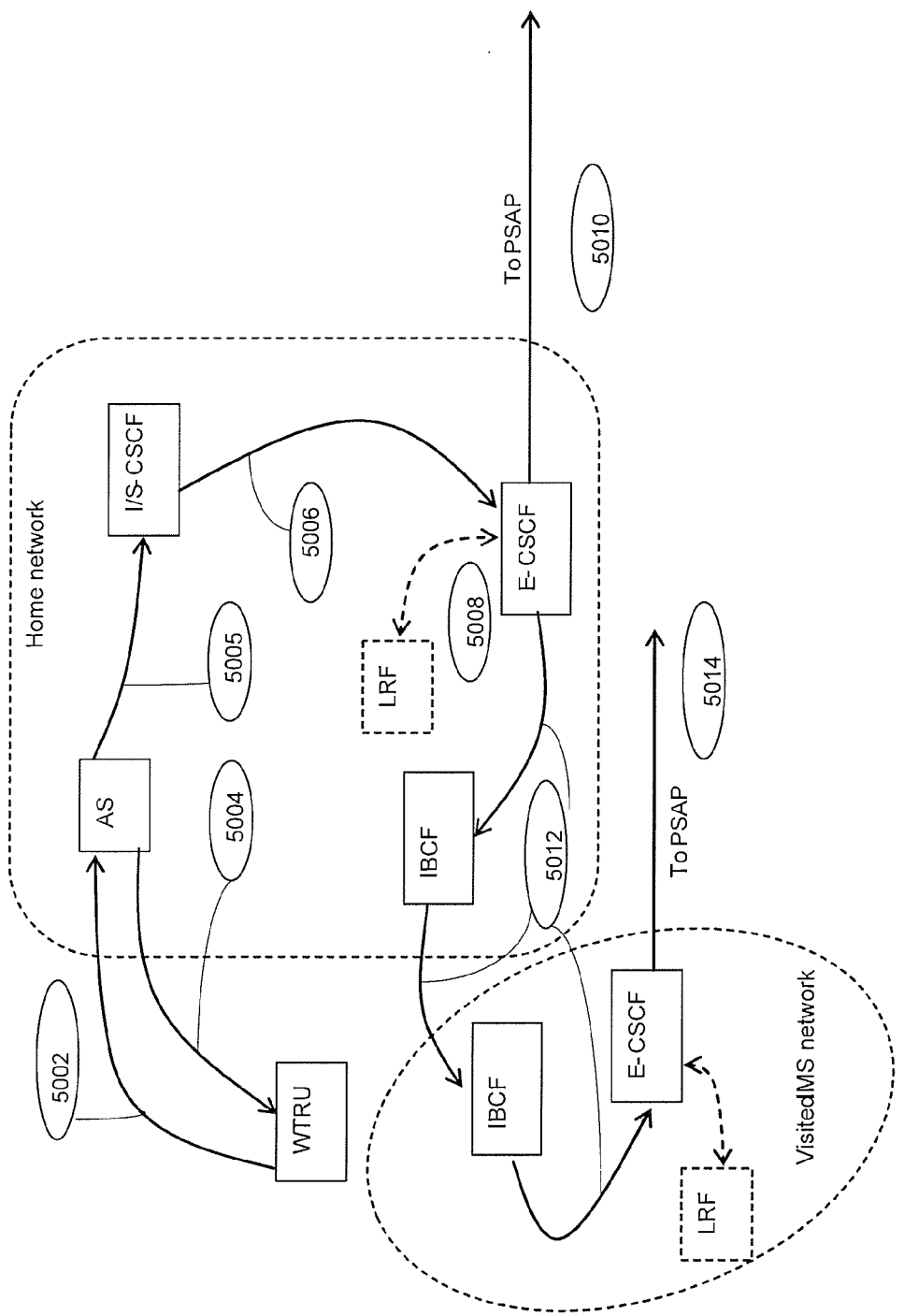
FIG. 5 illustrates an example embodiment of a network architecture for handling emergency calls initiated by a service consistent with embodiments.

FIG. 5 illustrates another embodiment of an IMS emergency services enabled network in which an emergency call may be initiated by a service, for example on behalf of a user. Referring to FIG. 5, at 5002, the user, through an interface, such as a click-to-call service (initiated through a dedicated interface such as a web portal, for example), may send a stimulus to the AS to establish an emergency call on behalf of the user. At 5004, the AS may send a message, such as an INVITE request for example, to the WTRU via one or more IMS CSCFs (not shown) and, at 5005, another message, such as an INVITE request, towards the PSAP. A Request-URI may be, for example 911 dialed digits or an emergency service URN. At 5006, the call may be routed towards the E-CSCF. At 5008, the E-CSCF may determine a user location. Embodiments contemplate that the E-CSCF may determine the user location with assistance from LRF. For example, the E-CSCF and/or the LRF may determine the user location by way of analysis of user included location information in the call or by querying a location server.

The WTRU may be located in the jurisdiction of the home communication network or the WTRU may be roaming in a visited communication network. Continuing to refer to FIG. 5, the E-CSCF and/or LRF may determine that the user may be in the home network. At 5010, the appropriate PSAP (e.g., a home communication PSAP) may be determined and the call may be routed to that PSAP. Alternatively, the E-CSCF and/or LRF may determine that the user may not be in the home network and may be roaming. At 5012, the E-CSCF, possibly with assistance from the LRF, may determine that the call should be routed to an E-CSCF in the local/visited network. Embodiments contemplate that the call may be routed to a local E-CSCF via one or more Interconnection Border Control Function (IBCF). At 5014, at a local/visited network E-CSCF, the appropriate PSAP may be determined (e.g., a visited network PSAP) and the call may be routed towards the determined PSAP.

Embodiments contemplate that emergency calls may be initiated using a private numbering plan. When using private numbering plan, a dialstring that may be used for the emergency service number may overlap with the dialplan used in the public network and vice versa. In the case of such an overlap, embodiments contemplate that the emergency dialed digits may need to be analyzed, and perhaps translated, before routing towards a PSAP. Also, the identity of an emergency caller may be part of a private dial plan. When using a private numbering plan, a dialstring that may be used for the emergency caller's identity may overlap with the dialplan used in the public network and vice versa. Embodiments contemplate that the emergency caller's identity may be translated to, for example to a globally routable URI/international format/use of phone-context, so that the PSAP may receive complete information about the caller. Also, as described previously, emergency calls may be initiated by a service when requested by the user.

Embodiments contemplate that an IMS emergency services enabled network may perform analysis of a user location, for example, in order to more accurately handle the emergency call. For a roaming user, embodiments contemplate that the call may need to be re-routed to the local (or remote) network or the caller may be requested to use the local (or remote) network. Whether the emergency caller accesses the IMS through a Proxy CSCF (P-CSCF) in a local network or the call is initiated by an AS or handled via an AS in the home network, it may be prudent for the emergency call to be handled in the local network (e.g., that may be local to the geographical location of the emergency caller).

Figure 6:
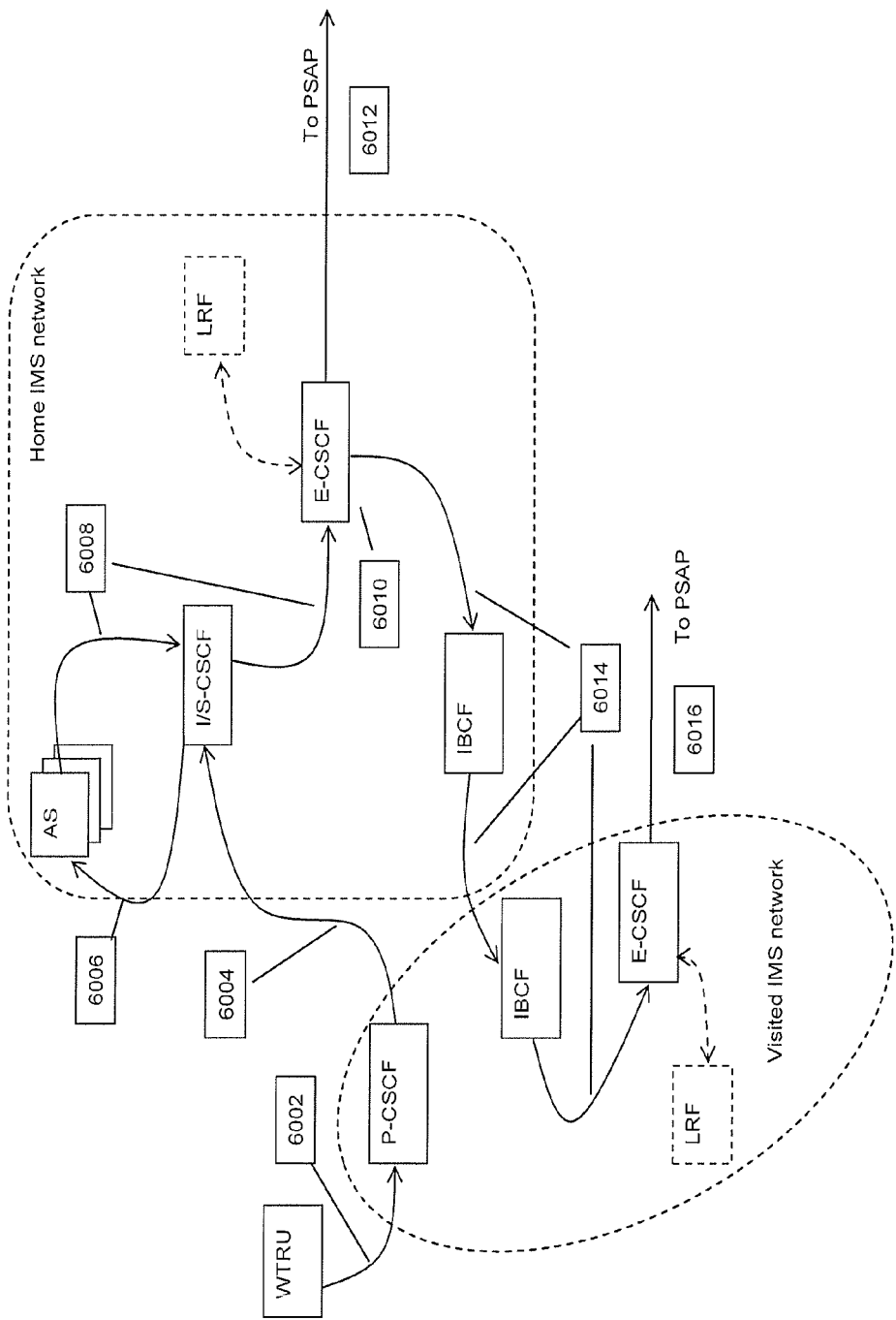
FIG. 6 illustrates an example embodiment of a network architecture for handling emergency calls initiated by a hosted enterprise consistent with embodiments.

FIG. 6 illustrates another embodiment of an IMS emergency services enabled network in which an emergency call may be initiated by a hosted-enterprise user. Referring to FIG. 6, at 6002, an enterprise user may initiate an emergency call. At 6004, the call may be routed to a home network by one or more P-CSCF so that, for example, enterprise services may be provided. At 6006, the call may be routed via one or more I/S-CSCF to one or more AS. The one or more AS may apply enterprise policies and/or perform number translation on the calling party number/called party number. At 6008, the call may be determined to pertain to an emergency services request and the call may be routed towards an E-CSCF, perhaps, in an embodiment, via an I-CSCF, or a C-CSCF, or a combination I/S-CSCF. At 6010, the E-CSCF may determine a user location. Embodiments contemplate that the E-CSCF may determine the user location with assistance from LRF. For example, the E-CSCF and/or the LRF may determine the user location by way of analysis of user included location information in the call or by querying a location server.

The WTRU may be located in the jurisdiction of the home network or the WTRU may be roaming in a visited network. Continuing to refer to FIG. 6 the E-CSCF and/or LRF may determine that the user may be in the home network. At 6012, the appropriate PSAP may be determined and the call may be routed to the PSAP. Alternatively or additionally, the E-CSCF and/or LRF may determine that the user may not be in the home network and may be roaming. The user may be roaming and at 6014, the E-CSCF, possibly with assistance from the LRF, may determine that the call should be routed to an E-CSCF in the local/visited network. In an embodiment, the call may be routed to a local E-CSCF via one or more Interconnection Border Control Function (IBCF). At 6016, at a local E-CSCF, the appropriate PSAP may be determined and the call may be routed towards the determined PSAP.

Figure 6A:
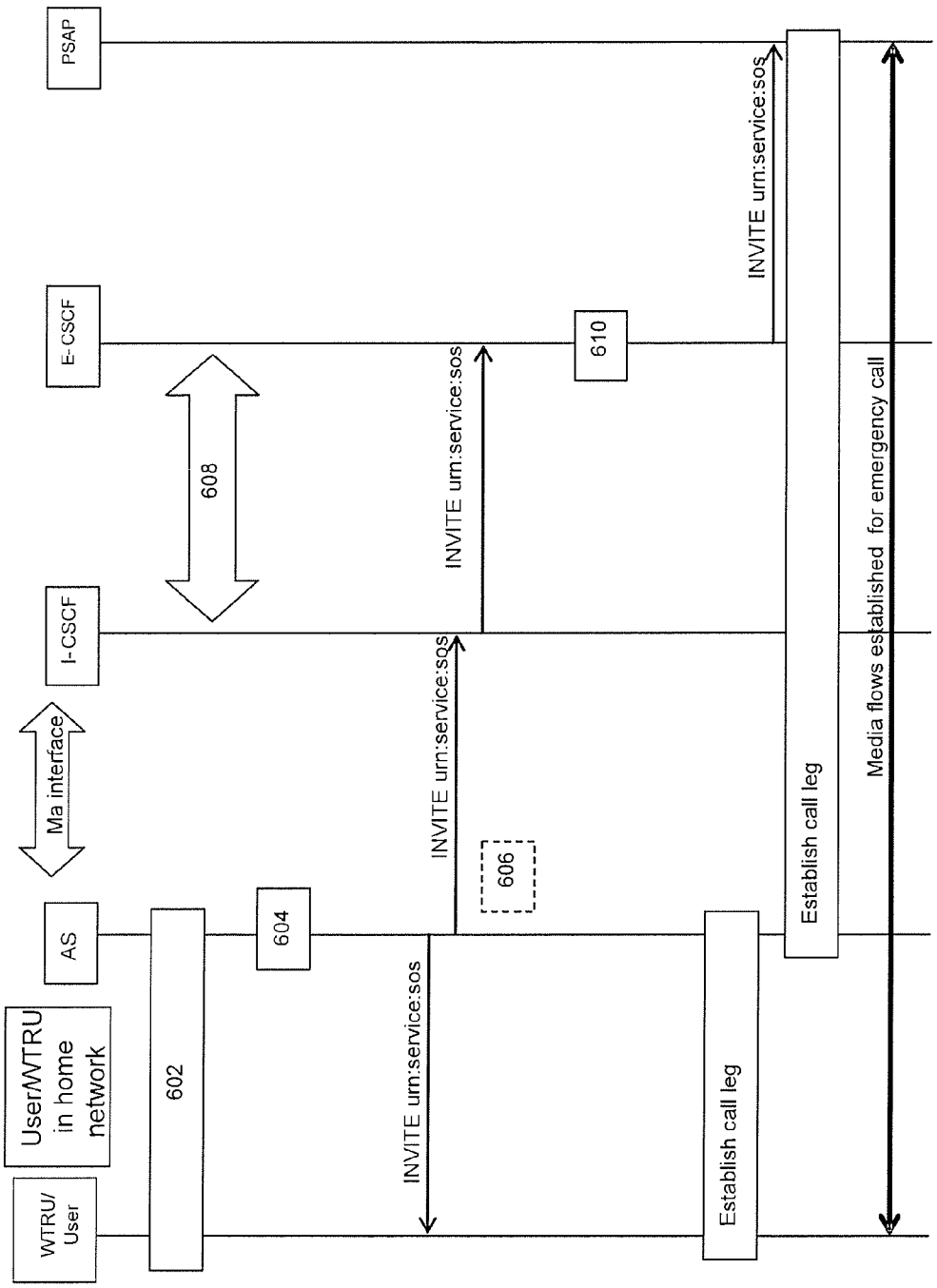
FIG. 6A illustrates an example embodiment of a call flow for handling emergency calls initiated by a service consistent with embodiments.

FIG. 6A illustrates an exemplary signal flow embodiment in which an emergency call may be initiated by a service on behalf of a user, who may be in or near a home network. Referring to FIG. 6A, at 602, the user/WTRU (or UE) may send a stimulus to the network to initiate an emergency call, for example via a web portal or some other interface/client. At 604, the AS may initiate an emergency call towards the PSAP, for example by using 3 pcc (third party call control). An INVITE may also be sent to the emergency caller's WTRU. Embodiments contemplate that the AS may know or may not know which S-CSCF the WTRU may be registered at, if any. Embodiments contemplate that the AS may route the call via an I-CSCF in situations in which the registered S-CSCF is unclear, for example.

Continuing to refer to FIG. 6A, at 606, embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 608, an interface, or reference point, may be established between the I-CSCF and the E-CSCF. This interface may, by way of example and not limitation, accommodate Session Initiation Protocol (SIP). At 610, the E-CSCF, perhaps with assistance from LRF, may use location information provided in the INVITE+service URN to determine which PSAP to route the emergency call. Embodiments contemplate that it may be determined that the user is located in the jurisdiction of the home network. The information may resolve to a local PSAP. It is possible that no location information may be provided in INVITE. The E-CSCF and/or the LRF may obtain location information from a network location server (not shown). Call legs and media flows for the emergency communication may be established between the PSAP and the user/WTRU.

Figure 7:
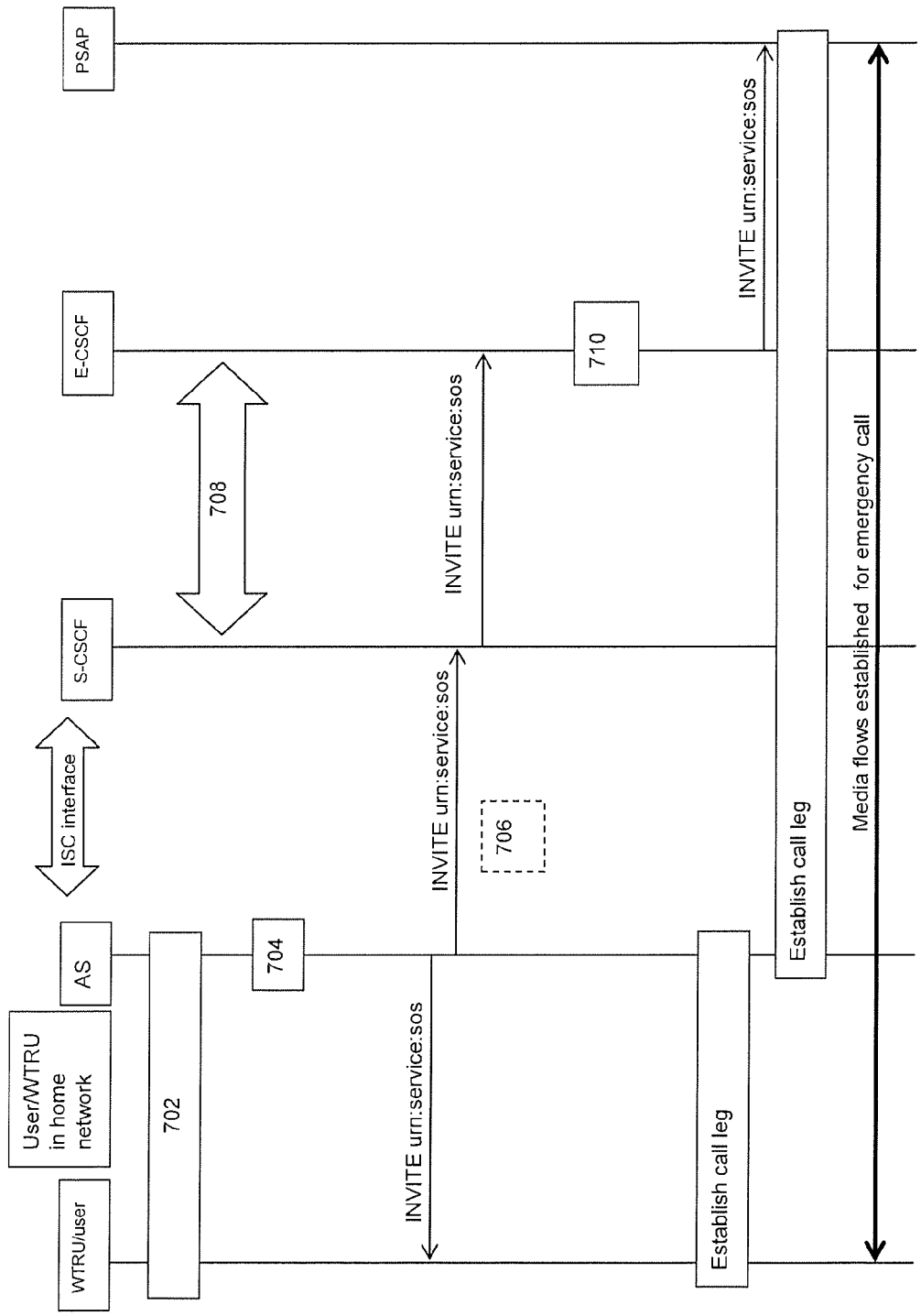
FIG. 7 illustrates another example embodiment of a call flow for handling emergency calls initiated by a service consistent with embodiments.

FIG. 7 illustrates an alternative exemplary signal flow contemplated by embodiments in which an emergency call may be initiated by a service on behalf of a user, who may be in or near a home network. Referring to FIG. 7, at 702 the user may send a stimulus to the network to initiate an emergency call, for example via a web portal or some other interface/client. At 704, the AS may initiate an emergency call towards the PSAP, for example using 3 pcc. An INVITE may also be sent to the emergency caller's WTRU. Embodiments contemplate that the AS may be aware of with which S-CSCF the WTRU may be registered.

At 706, embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 708, an interface, or reference point, may be established between the S-CSCF and the E-CSCF. This interface may, by way of example and not limitation, accommodate Session Initiation Protocol (SIP). At 710, the E-CSCF, perhaps with assistance from the LRF, may use location information provided in the INVITE+service URN to determine which PSAP to route the emergency communication. It may be determined that the user is located in the jurisdiction of home network and the information may resolve to a local PSAP. Embodiments contemplate that it is possible that no location information may be provided in INVITE, and that the E-CSCF and/or the LRF may obtain location from a network location server (not shown). Call legs and media flows for the emergency communication may be established between the PSAP and the user/WTRU.

Figure 8:
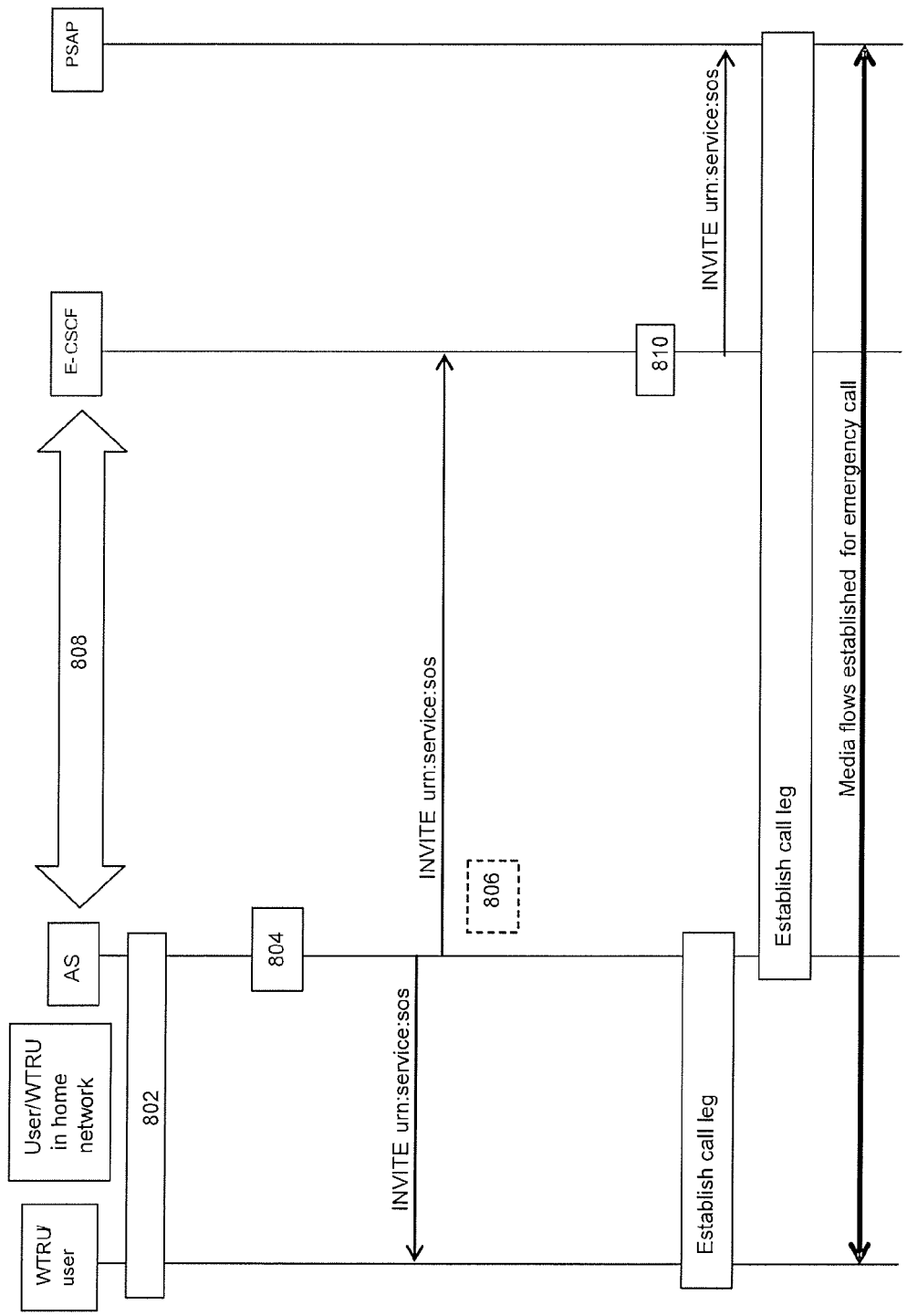
FIG. 8 illustrates another example embodiment of a call flow for handling emergency calls initiated by a service consistent with embodiments.

FIG. 8 illustrates an alternative exemplary signal flow contemplated by embodiments in which an emergency call may be initiated by a service on behalf of a user, who may be in or near a home network. Referring to FIG. 8, at 802 the user may send a stimulus to the network to initiate an emergency call, for example via a web portal or some other interface/client. At 804, the AS may initiate an emergency call towards the PSAP, for example using 3 pcc. An INVITE may also be sent to the emergency caller's WTRU.

At 806, embodiments contemplate that emergency calls may be forwarded to the E-CSCF for further routing decisions. Embodiments contemplate that emergency calls may be forwarded unconditionally. Alternatively, emergency calls may be forwarded conditionally, perhaps depending on an operator or regulatory policy, for example. At 808, an interface, or reference point, may be established between the AS and the E-CSCF. This interface may, by way of example and not limitation, accommodate Session Initiation Protocol (SIP). At 810, the E-CSCF, perhaps with assistance from the LRF, may use location information provided in the INVITE+service URN to determine which PSAP to route to. It may be determined that the user is located in the jurisdiction of the home network and the information may resolve to a local PSAP. Embodiments contemplate that no location information may be provided in INVITE, and in such cases embodiments contemplate that the E-CSCF and/or the LRF may obtain location from a network location server (not shown). Call legs and media flows for the emergency communication may be established between the PSAP and the user/WTRU.

Figure 9:
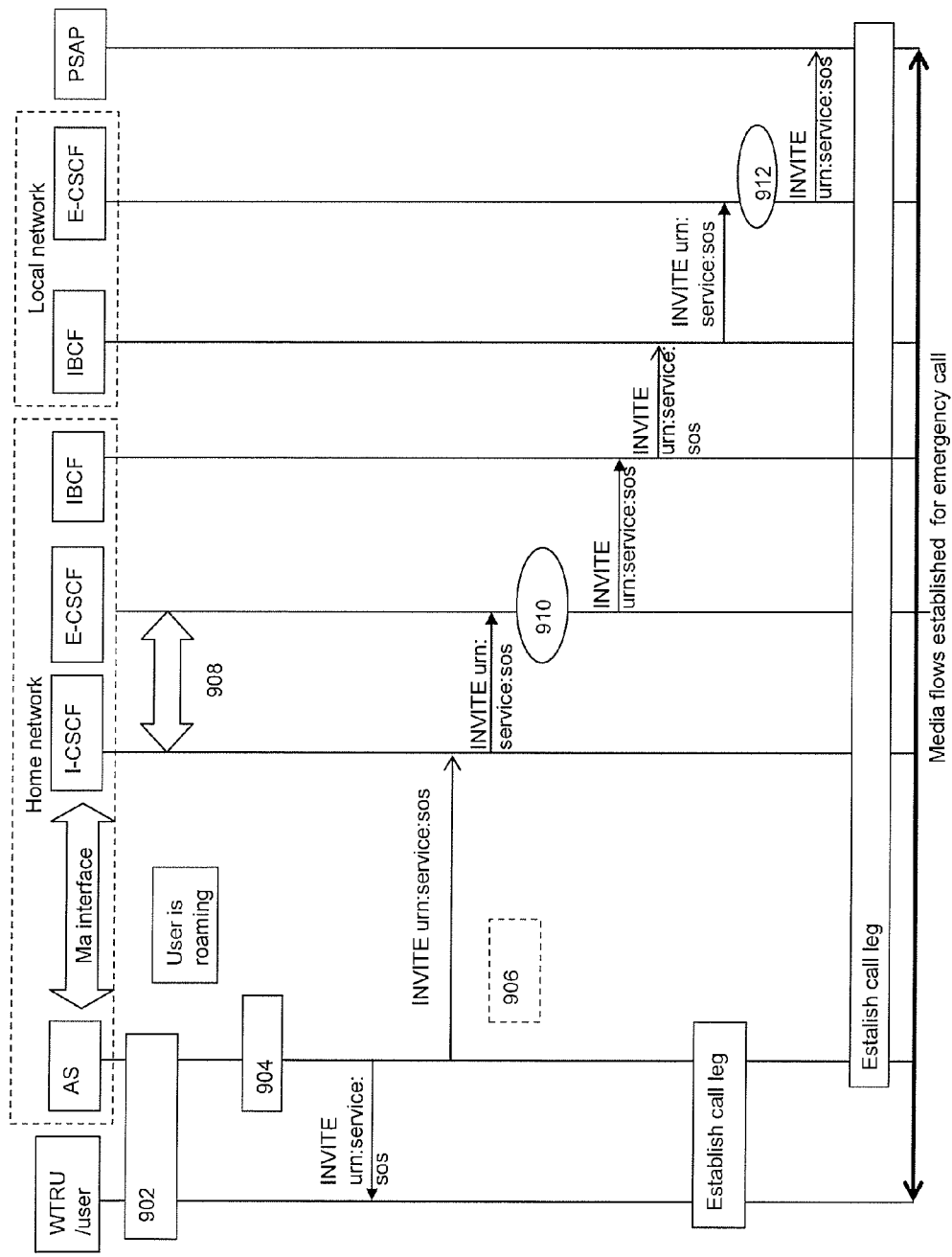
FIG. 9 illustrates another example embodiment of a call flow for handling emergency calls initiated by a service consistent with embodiments.

FIG. 9 illustrates an alternative exemplary signal flow contemplated by embodiments in which an emergency call may be initiated by a service on behalf of a user, who may be roaming and not in or near a home network. Referring to FIG. 9, at 902 the user may send a stimulus to the network to initiate an emergency call, for example via a web portal or some other interface/client. At 904, the AS may initiate an emergency call towards the PSAP, for example using 3 pcc. An INVITE may also be sent to the emergency caller's WTRU. The AS may not know which S-CSCF the WTRU is registered at, if any. Embodiments contemplate that the AS may route the call via an I-CSCF. Alternatively, embodiments contemplate that a network configuration may route the emergency call from the AS to the I-CSCF regardless of the AS knowledge of which S-CSCF the WTRU is registered at, if any.

At 906, embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 908, an interface, or reference point, may be established between the I-CSCF and the E-CSCF. This interface may, by way of example and not limitation, accommodate Session Initiation Protocol (SIP). At 910, the E-CSCF, perhaps with assistance from the LRF (not shown), may use location information provided in the INVITE+service URN to determine which PSAP to route to. It may be determined that the user is located in the jurisdiction of a different (or visited) network. The call may be routed to another network. It is possible that no location information may be provided in INVITE, and embodiments contemplate that E-CSCF and/or the LRF may obtain location from a network location server (not shown). At 912, the E-CSCF in a visited or local network, perhaps with assistance from an LRF, may use location information provided in the INVITE+ service URN to determine to which PSAP to route the emergency communication. It is possible that no location information may be provided in INVITE, and embodiments contemplate that the E-CSCF and/or the LRF may obtain location from a network location server (not shown). Call legs and media flows for the emergency communication may be established between the PSAP and the user/WTRU.

Figure 10:
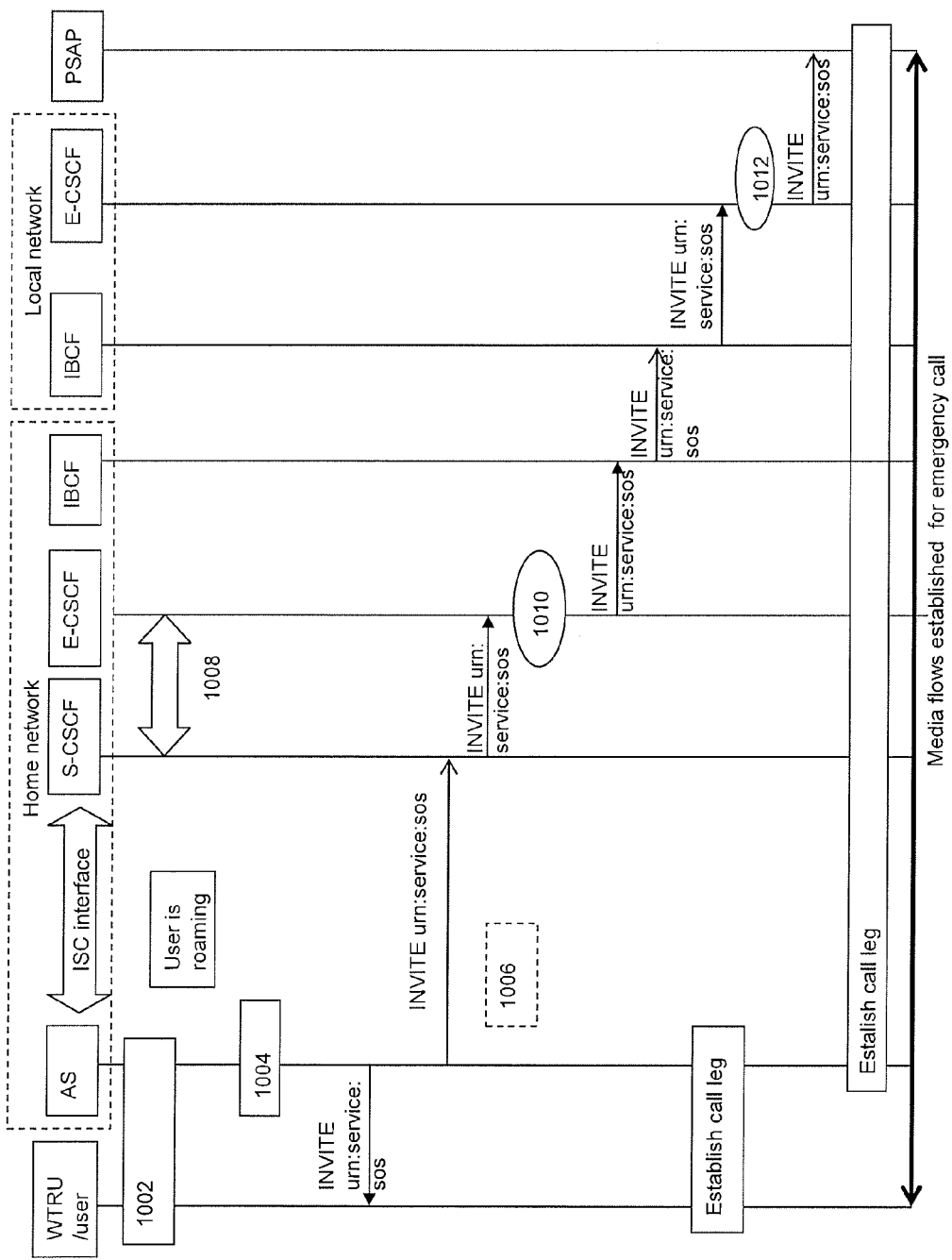
FIG. 10 illustrates another example embodiment of a call flow for handling emergency calls initiated by a service consistent with embodiments.

FIG. 10 illustrates an alternative exemplary signal flow contemplated by embodiments in which an emergency call may be initiated by a service on behalf of a user, who may be roaming and not in or near a home network. Referring to FIG. 10, at 1002 the user may send a stimulus to the network to initiate an emergency call, for example via a web portal or some other interface/client. At 1004, the AS may initiate an emergency call towards the PSAP, for example using 3 pcc. An INVITE may also be sent to the emergency caller's WTRU. The AS may be aware of with which S-CSCF the WTRU may be registered.

At 1006, embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 1008, an interface, or reference point, may be established between the S-CSCF and the E-CSCF. This interface may, by way of example and not limitation, accommodate Session Initiation Protocol (SIP). At 1010, the E-CSCF, perhaps with assistance from an LRF, may use location information provided in the INVITE+service URN to determine to which PSAP to route the emergency communication. It may be determined that the user is located in the jurisdiction of a different (or visited) network. The call may be routed to another network. It is possible that no location information may be provided in INVITE, and embodiments contemplate that the E-CSCF and/or the LRF may obtain location from a network location server (not shown). At 1012, the E-CSCF in a visited or local network, perhaps with assistance from the LRF, may use location information provided in the INVITE+service URN to determine which PSAP to route to. Embodiments contemplate that is possible that no location information may be provided in INVITE. The E-CSCF and/or the LRF may obtain location from a network location server (not shown). Call legs and media flows for the emergency communication may be established between the PSAP and the user/WTRU.

Figure 11:
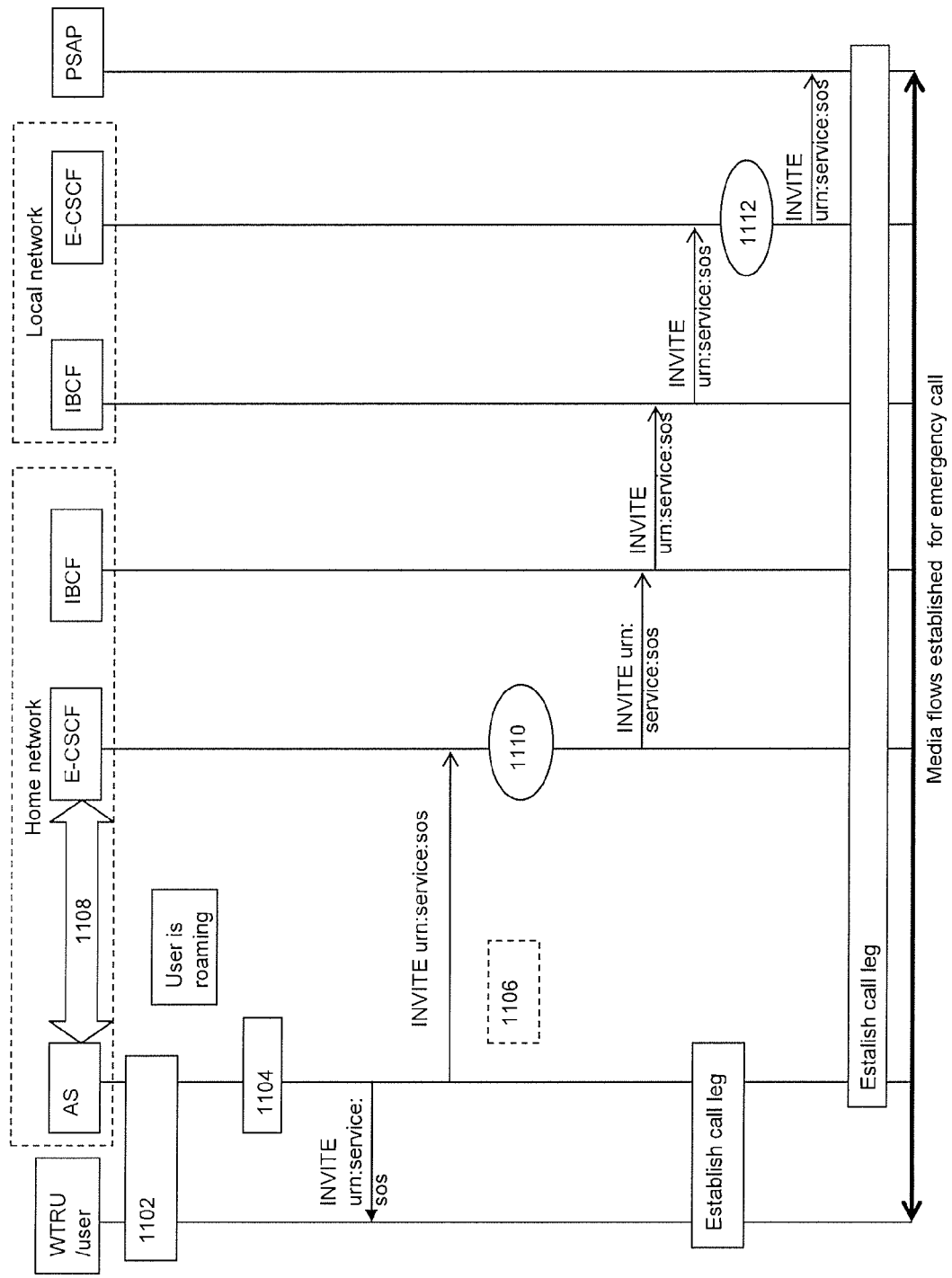
FIG. 11 illustrates another example embodiment of a call flow for handling emergency calls initiated by a service.

FIG. 11 illustrates an alternative exemplary signal flow contemplated by embodiments in which an emergency call may be initiated by a service on behalf of a user, who may be roaming and not in or near a home network. Referring to FIG. 11, at 1102 the user may send a stimulus to the network to initiate an emergency call, for example via a web portal or some other interface/client. At 1104, the AS may initiate an emergency call towards the PSAP, for example using 3 pcc. An INVITE may also be sent to the emergency caller's WTRU.

At 1106, embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 1108, an interface, or reference point, may be established between the AS and the E-CSCF. This interface may, by way of example and not limitation, accommodate Session Initiation Protocol (SIP). At 1110, the E-CSCF, perhaps with assistance from an LRF, may use location information provided in the INVITE+service URN to determine to which PSAP to route the emergency communication. It may be determined that the user is located in the jurisdiction of a different network. The call may be routed to another network. Embodiments contemplate that it is possible that no location information may be provided in INVITE, and that the E-CSCF and/or the LRF may obtain location from a network location server (not shown). At 1112, the E-CSCF in a visited or local network, perhaps with assistance from an LRF, may use location information provided in the INVITE+service URN to determine to which PSAP to route the emergency communication. It is possible that no location information may be provided in INVITE, and embodiments contemplate that the E-CSCF and/or the LRF may obtain location from a network location server (not shown). Call legs and media flows for the emergency communication may be established between the PSAP and the user/WTRU.

Figure 12:
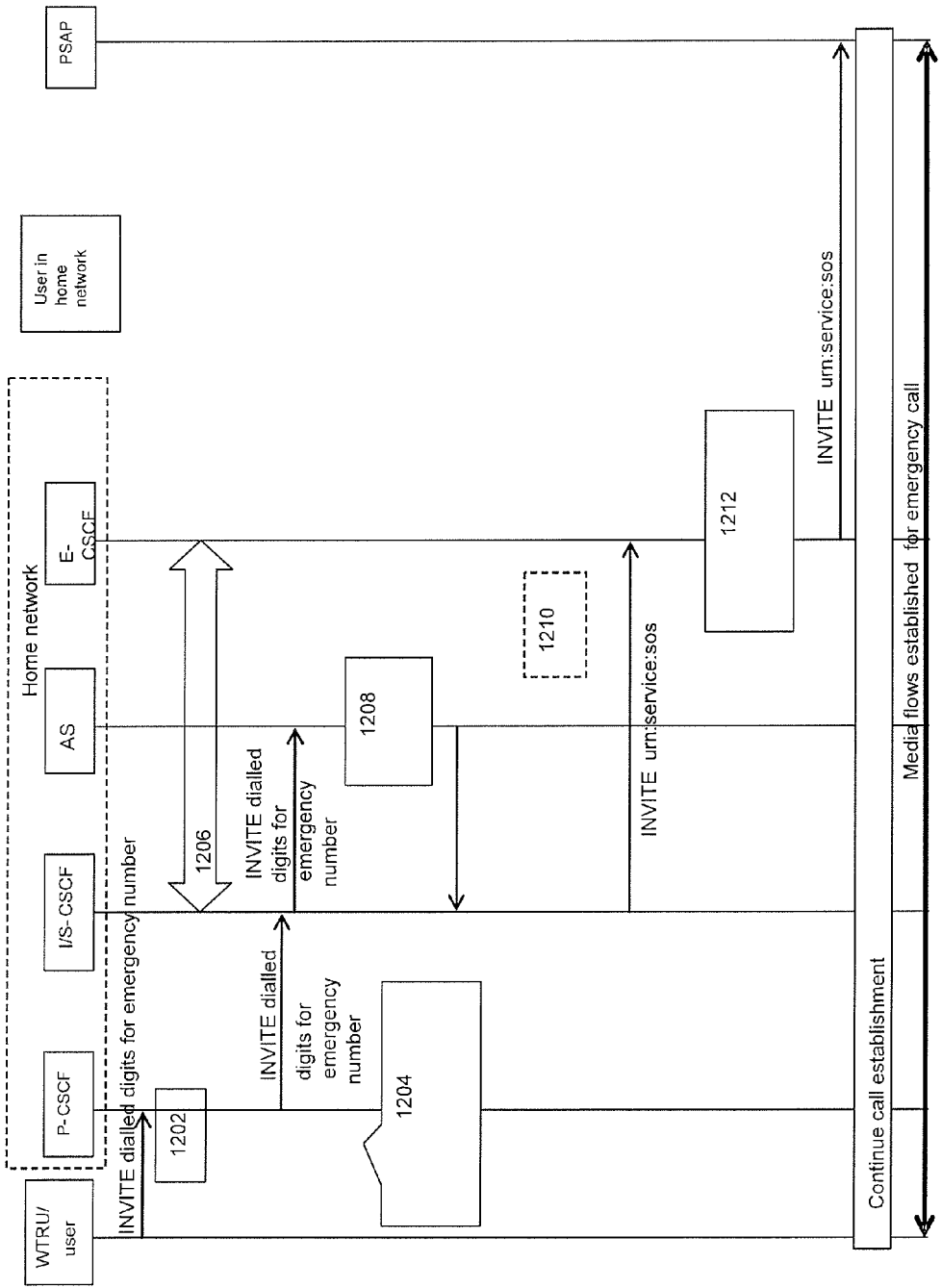
FIG. 12 illustrates an example embodiment of a call flow for handling emergency calls initiated by a hosted enterprise consistent with embodiments.

FIG. 12 illustrates an alternative exemplary signal flow contemplated by embodiments in which an emergency call may be initiated by a hosted enterprise, where a user who may be in or near a home network. Referring to FIG. 12, at 1202, a P-CSCF may be unable to resolve dialed digits (from a user/WTRU) to emergency service URN. At 1204, the dialed digits may be resolved to an emergency service URN by either the WTRU and/or the P-CSCF. The INVITE may include the service URN in the Request URI and no translation may be required at the AS.

At 1206, an interface, or reference point, may be established between I/S-CSCF and E-CSCF. This interface may, by way of example and not limitation, accommodate Session Initiation Protocol (SIP). At 1208, the AS may perform hosted services as policy may allow services to be applied to an emergency call. Embodiments contemplate that the user may be identified by a private number plan, and embodiments contemplate that AS may translate calling/called party ID. The emergency number dialed may be a private number that resolves to a public emergency service—the AS may translate the dialed number to an emergency service URN. At 1210, embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 1212, the E-CSCF, perhaps with assistance from an LRF (not shown), may use location information provided in the INVITE+service URN to determine to which PSAP to route the emergency communication. It may be determined that the user is located in the jurisdiction of the home network, and embodiments contemplate that the information may resolve to a local PSAP. Alternatively, embodiments contemplate that it is possible that no location information may be provided in INVITE, and that an E-CSCF and/or an LRF may obtain location information from a network location server (not shown). Call legs and media flows for the emergency communication may be established between the PSAP and the user/WTRU.

Figure 13:
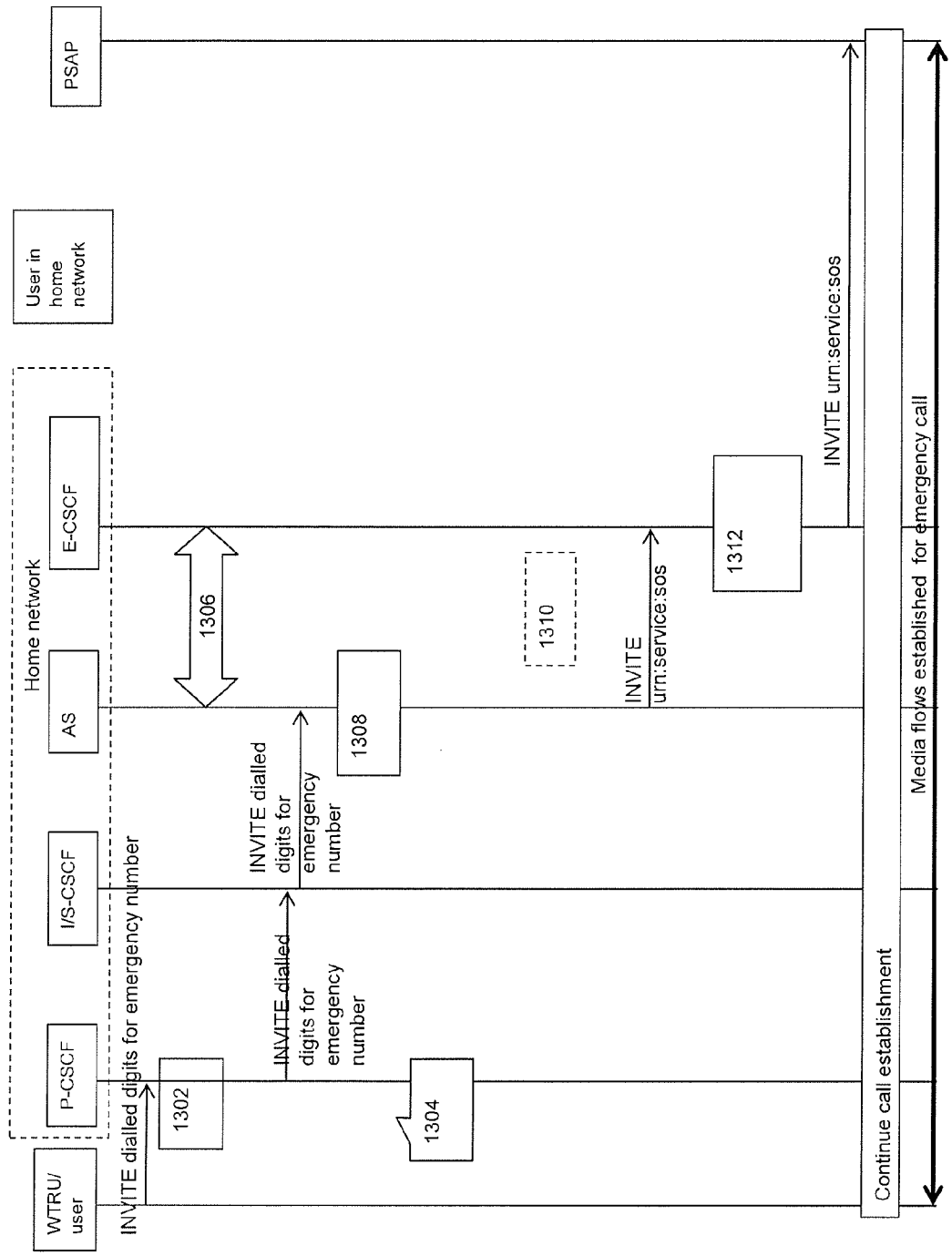
FIG. 13 illustrates another example embodiment of a call flow for handling emergency calls initiated by a hosted enterprise consistent with embodiments.

FIG. 13 illustrates an alternative exemplary signal flow consistent with embodiments in which an emergency call may be initiated by a hosted enterprise, where a user may be in or near a home network. Referring to FIG. 13, at 1302, embodiments contemplate that a P-CSCF may be unable to resolve dialed digits to emergency service URN received from a WTRU/user. At 1304, the dialed digits may be resolved to an emergency service URN by either the WTRU and/or the P-CSCF. Embodiments contemplate that the INVITE may include the service URN in the Request URI and no translation may be required at the AS.

At 1306, an interface, or reference point, may be established between the AS and the E-CSCF. This interface may, by way of example and not limitation, accommodate Session Initiation Protocol (SIP). At 1308, the AS may perform hosted services, as policy may allow services to be applied to an emergency call. AS may translate calling/called party ID since the user may be identified by a private number plan. The emergency number dialed may be a private number that resolves to a public emergency service—the AS may translate dialed number to an emergency service URN. At 1310 embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 1312, the E-CSCF, perhaps with assistance from the LRF (not shown), may use location information provided in the INVITE+service URN to determine to which PSAP to route the emergency communication. It may be determined that the user is located in the jurisdiction of the home network, and embodiments contemplate that he information may resolve to a local PSAP. It is possible that no location information may be provided in INVITE, and embodiments contemplate that the E-CSCF and/or the LRF may obtain location information from a network location server (not shown). Call legs and media flows for the emergency communication may be established between the PSAP and the user/WTRU.

Figure 14:
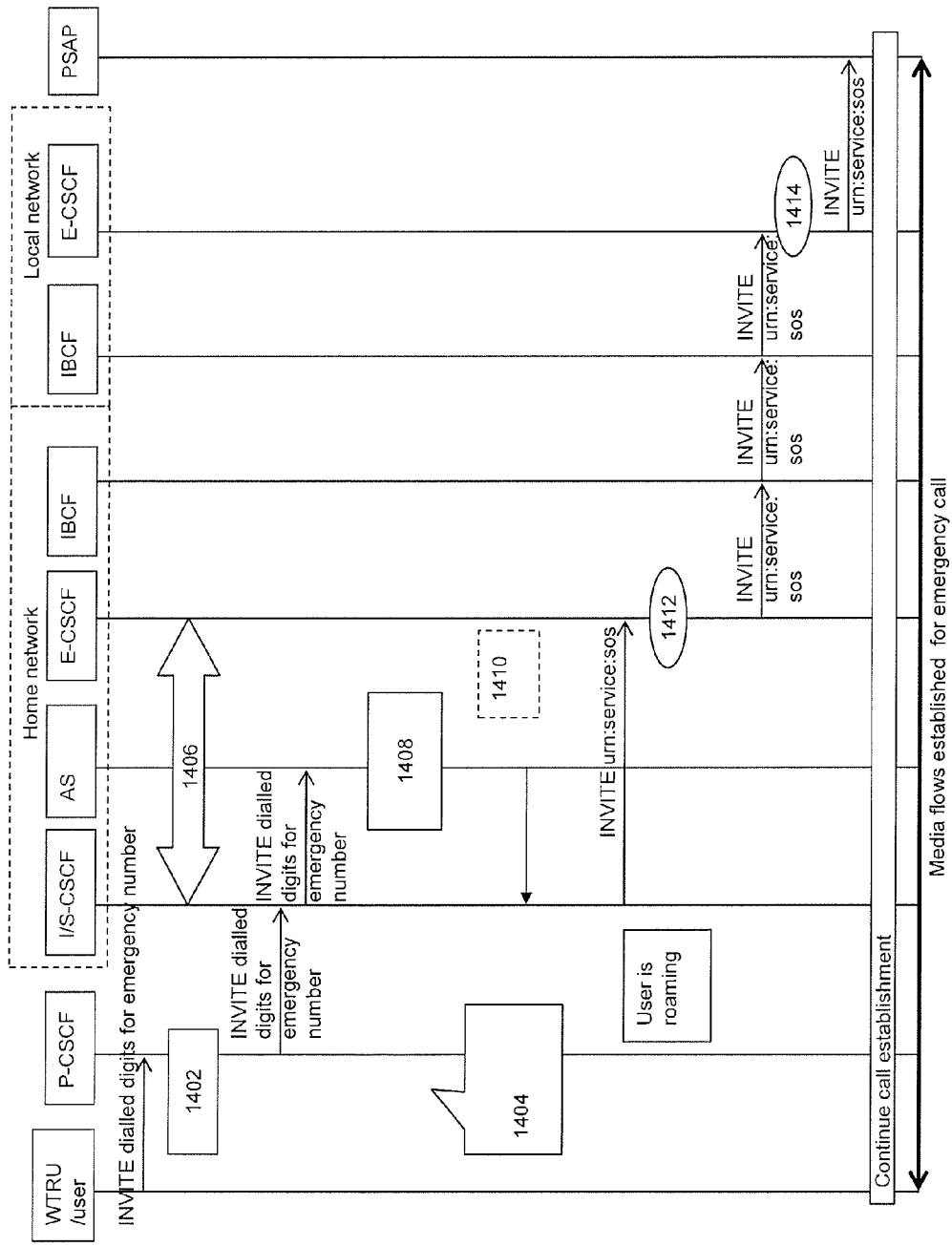
FIG. 14 illustrates another example embodiment of a call flow for handling emergency calls initiated by a hosted enterprise consistent with embodiments.

FIG. 14 illustrates an alternative exemplary signal flow contemplated by embodiments in which an emergency call may be initiated by a hosted enterprise, where a user may be roaming and not in or near a home network. Referring to FIG. 14, at 1402, a P-CSCF may be unable to resolve dialed digits to emergency service URN received from a WTRU. At 1404, the dialed digits may be resolved to an emergency service URN by either the WTRU and/or the P-CSCF. Embodiments contemplate that the INVITE may include the service URN in the Request URI and no translation may be required at AS.

At 1406, an interface, or reference point, may be established between I/S-CSCF and E-CSCF. This interface may, by way of example and not limitation, accommodate Session Initiation Protocol (SIP). At 1408, the AS may perform hosted services, as policy may allow services to be applied to an emergency call. The AS may translate calling/called party ID where the user may be identified by a private number plan. Embodiments contemplate that the emergency number dialed may be a private number that resolves to a public emergency service—the AS may translate dialed number to an emergency service URN. At 1410, embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 1412, the E-CSCF, perhaps with assistance from the LRF (not shown), may use location information provided in the INVITE+service URN to determine to which PSAP to route the emergency communication (via one or more intermediate nodes, as may be required or useful).

It may be determined that the user is located in the jurisdiction of a different network, and embodiments contemplate that the call may be routed to another network. It is possible that no location information may be provided in INVITE, and embodiments contemplate that the E-CSCF and/or the LRF (not shown) may obtain location information from a network location server (not shown). At 1414, the E-CSCF in a visited or local network, perhaps with assistance from the LRF, may use location information provided in the INVITE+service URN to determine to which PSAP to route the emergency communication. It is possible that no location information was provided in INVITE, and embodiments contemplate that the E-CSCF and/or the LRF may obtain location information from a network location server (not shown). Call legs and media flows for the emergency communication may be established between the PSAP and the user/WTRU.

Figure 15:
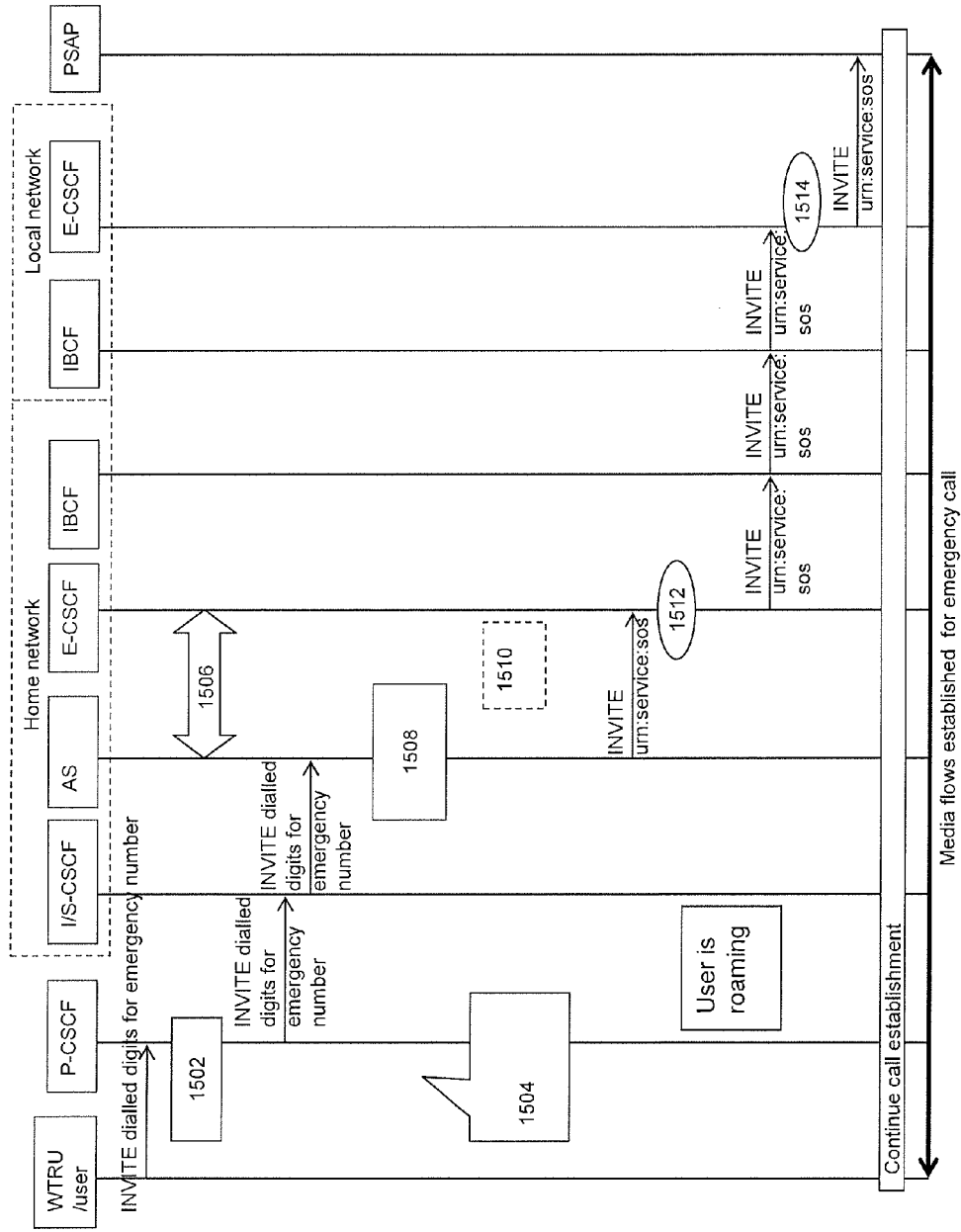
FIG. 15 illustrates another example embodiment of a call flow for handling emergency calls initiated by a hosted enterprise; consistent with embodiments.

FIG. 15 illustrates an alternative exemplary signal flow contemplated by embodiments in which an emergency call may be initiated by a hosted enterprise, where a user may be roaming and not in or near a home network. Referring to FIG. 15, at 1502, a P-CSCF may be unable to resolve dialed digits to emergency service URN from the user/WTRU. At 1504, the dialed digits may be resolved to an emergency service URN by either the WTRU and/or the P-CSCF. Embodiments contemplate that the INVITE may include the service URN in the Request URI and no translation may be required at the AS.

At 1506, an interface, or reference point, may be established between the AS and the E-CSCF. This interface may, by way of example and not limitation, accommodate Session Initiation Protocol (SIP). At 1508, the AS may perform hosted services, as policy may allow services to be applied to an emergency call. The AS may translate calling/called party ID where the user may be identified by a private number plan. The emergency number dialed may be a private number that resolves to a public emergency service—the AS may translate dialed number to an emergency service URN. At 1510 embodiments contemplate that emergency calls may be forwarded to the E-CSCF for further routing decisions. Embodiments contemplate that emergency calls may be forwarded unconditionally. Alternatively, embodiments contemplate that emergency calls may be forwarded conditionally, perhaps depending on an operator or regulatory policy, for example. At 1512, the E-CSCF, perhaps with assistance from the LRF (not shown), may use location information provided in the INVITE+service URN to determine to which PSAP to route the emergency communication. It may be determined that the user is located in the jurisdiction of a different network, and embodiments contemplate that the call may be routed to another network. It is possible that no location information may be provided in INVITE, and embodiments contemplate that the E-CSCF and/or the LRF may obtain location information from a network location server (not shown).

At 1514, the E-CSCF in a local or visited network, perhaps with assistance from LRF, may use location information provided in the INVITE+service URN to determine to which PSAP to route the emergency communication. It is possible that no location information may be provided in INVITE, and embodiments contemplate that the E-CSCF and/or the LRF may obtain location information from a network location server (not shown). Call legs and media flows for the emergency communication may be established between the PSAP and the user/WTRU.

In embodiments in which an emergency call may be initiated by service and in embodiments in which an emergency call may be initiated by a enterprise user/user within private numbering plan, the AS may forward the emergency call to either a local (or visited) network E-CSCF and/or to a home network E-CSCF. In the exemplary embodiments illustrated in FIG. 6-15, the emergency call may be forwarded from the AS in the home network to an E-CSCF in the home network. The AS may be capable of determining whether the user/device initiating the emergency call is within its home network jurisdiction, or is roaming and in the jurisdiction of a different network (e.g., a visited or local network). Upon making such determinations, the AS may route the emergency call either to an E-CSCF in the home network, and/or to an E-CSCF in the local or "visited" network in which the user/WTRU may be roaming.

Embodiments contemplate that one or more AS can make use of location information provided by the WTRU (and/or the AS in the case of emergency call initiated by service, for example) either in the Presence Information Data Format Location Object (PIDF-LO) body; Geolocation header; and/or P-Access-Network-Info header, for example.

Embodiments contemplate that one or more AS may determine that the WTRU is not within the jurisdiction of the home network, and the AS may resolve the identity of the local (or visited) network to forward the emergency request towards. Embodiments contemplate architectural modifications for forwarding the emergency request from the AS to a local E-CSCF. Also, embodiments contemplate that a local (or visited) network may be identified through a P-Visited-Network-ID header, as such headers may be available, for example.

Figure 16:
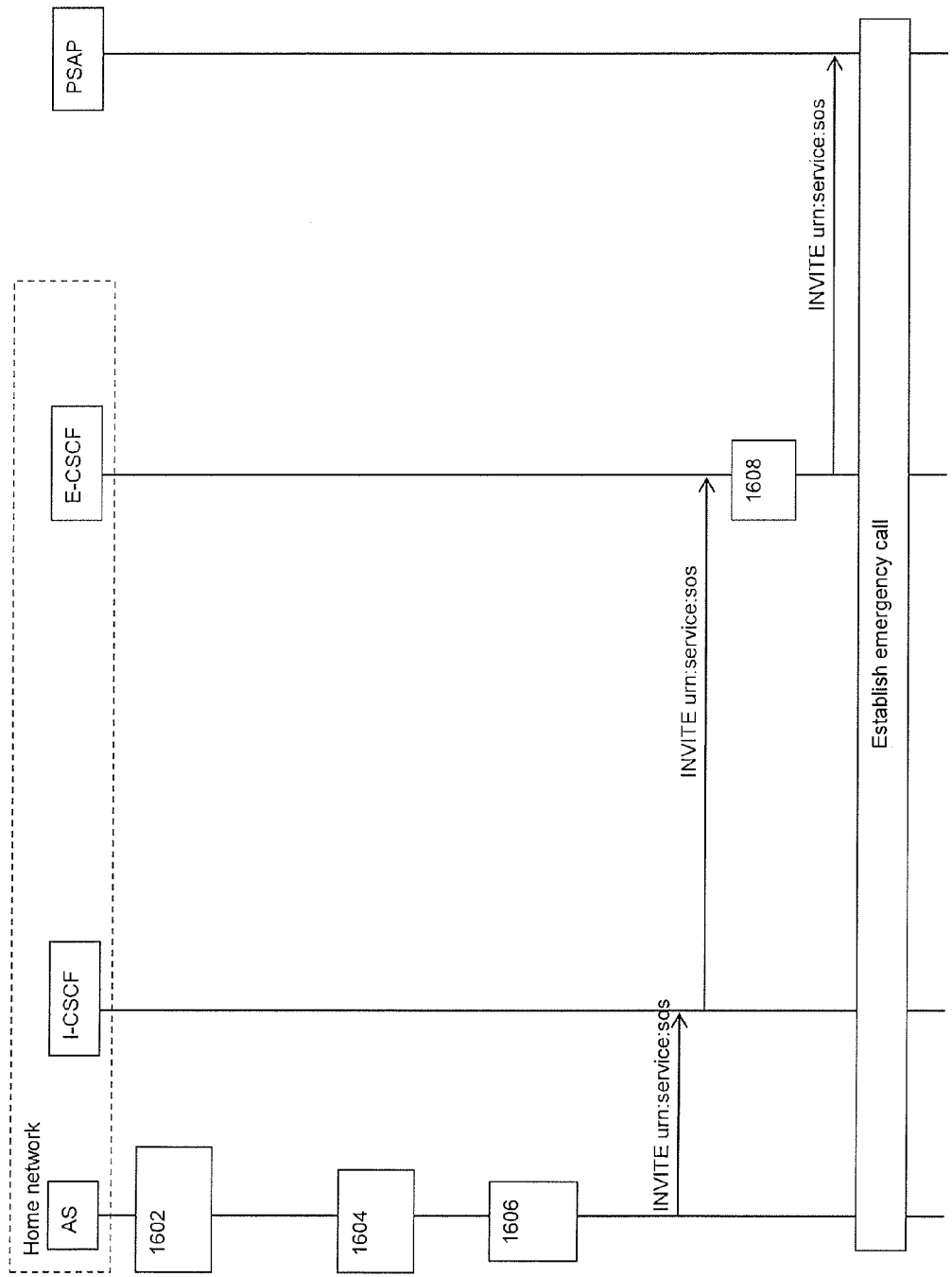
FIG. 16 illustrates an example embodiment of a call flow for handling emergency calls in a home network consistent with embodiments.

FIG. 16 illustrates an exemplary embodiment of an AS routing an emergency call in a home network. Referring to FIG. 16, at 1602, an AS either may generate an emergency request on behalf of user, or may receive an emergency request from an enterprise user/user in private number plan. At 1604, using information provided in a session initiation protocol (SIP) request (for example), the AS may determine that the user is within the jurisdiction of the home network. Embodiments contemplate that the determination may make use of location information and may make use of the Location-to-Service Translation (LoST) protocol.

At 1606, the AS may perform one or more, or any required or desired number translation of a calling/called party. At 1608, an E-CSFC may, perhaps with assistance from an LRF, resolve service URN and location information to a PSAP URI. The emergency communication may be established between the AS (perhaps on behalf of a user) and an appropriate PSAP.

Figure 17:
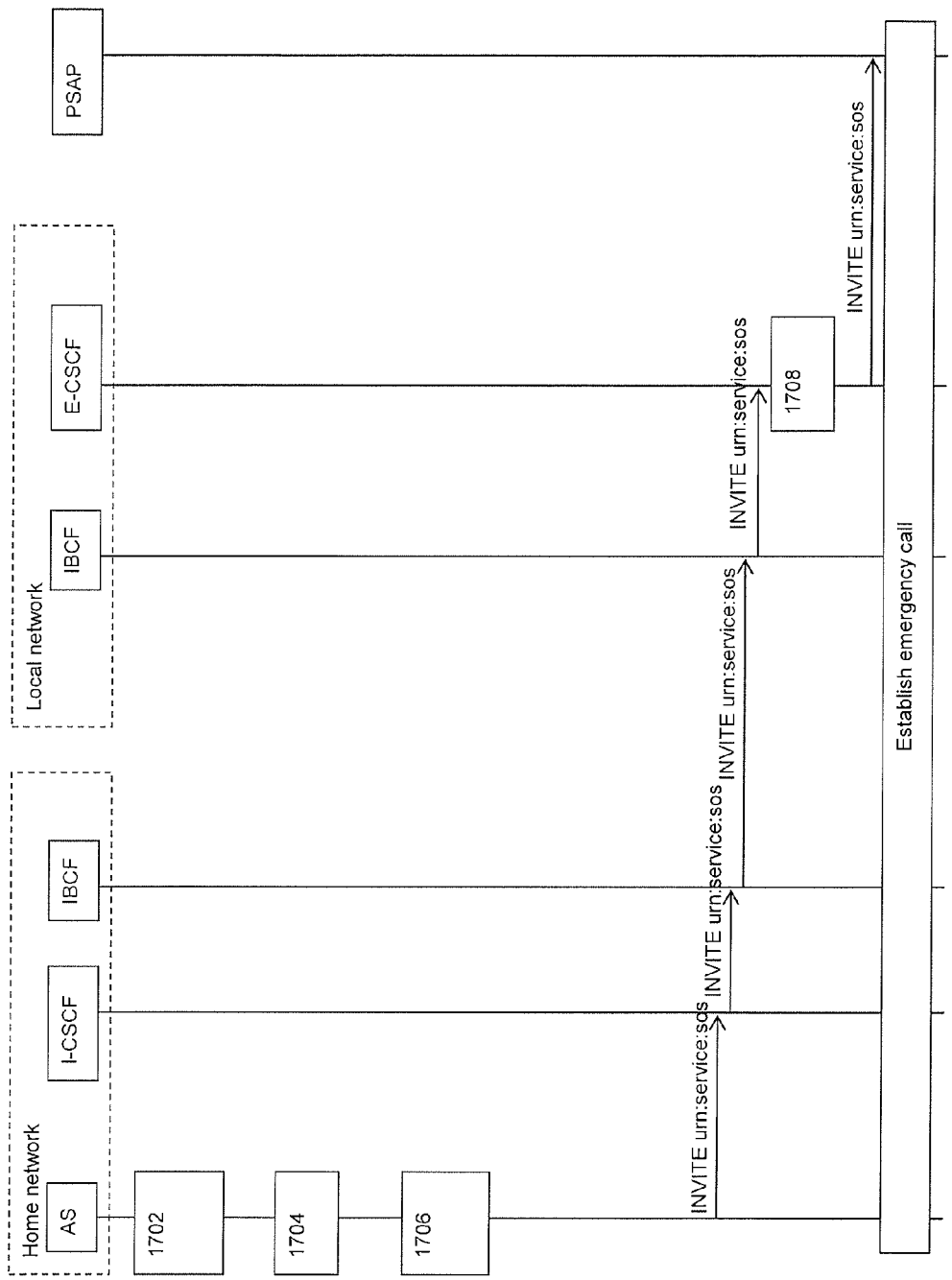
FIG. 17 illustrates an example embodiment of a call flow for handling emergency calls in a local or visited network consistent with embodiments.

FIG. 17 illustrates an embodiment of an AS routing of an emergency call to a local network E-CSCF. Referring to FIG. 17, at 1702, an AS either may generate an emergency request on behalf of user, or may receive an emergency request from an enterprise user/user in private number plan. At 1704, using information provided in an SIP request (for example), the AS may determine that the user is outside the jurisdiction of the home network and may identify the local (or visited) network that may best handle the emergency call. Embodiments contemplate that the determination may make use of location information and may make use of the LoST protocol.

At 1706, the AS may perform one or more, or any required or desired number translation of a calling/called party. At 1708, an E-CSFC may, perhaps with assistance from an LRF, resolve service URN and location information to a PSAP URI. The emergency communication may be established between the AS (perhaps on behalf of a user) and an appropriate PSAP.

Embodiments contemplate that the AS may attempt to resolve Location information and emergency service URN using the LoST protocol (Location-to-Service Translation). The LoST protocol may be used to resolve location information and service URN to a PSAP URI. Embodiments contemplate that the LoST query may be capable of determining whether the emergency call can be handled in the home network or not. For example, should the LoST query succeed, the call may be handled in the serving (home) network. Also by way of example, should the LoST query fail, another network may be better suited to handle the emergency call.

Embodiments contemplate that should the LoST query result in a PSAP URI, an emergency call may be routed directly to a PSAP and may by-pass the E-CSCF altogether. Alternatively or additionally, the E-CSCF communication with the LRF may also be used to obtain an Emergency Service Query Key (ESQK) which may be used by the PSAP to make subsequent queries to the LRF. In such embodiments, a by-pass of the E-CSCF for emergency calls handled by AS may not be made.

Figure 18:
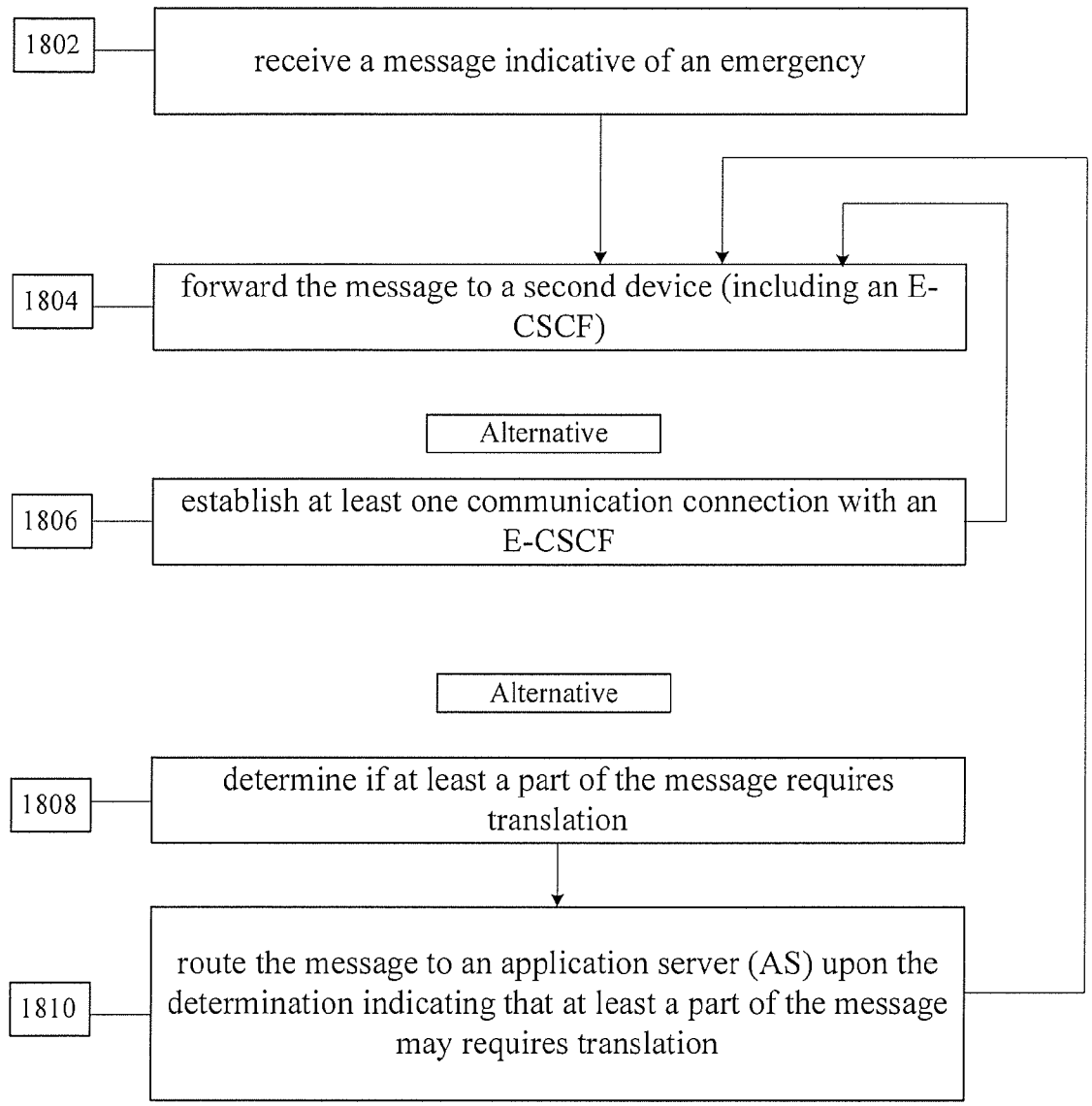
FIG. 18 illustrates a flow diagram of call flow exemplary embodiments.

In light of the previous description and FIGS. 1-17, and referring now to FIG. 18, embodiments contemplate that a first device, which may be in communication with a communication network, may be configured, at least in part, to, at 1802, receive a message indicative of an emergency; and, at 1804, forward the message to a second device. Embodiments contemplate that the second device may be in communication with the communication network. Embodiments also contemplate that the first device may include a serving call session control function (S-CSCF), and the second device may include an emergency call session control function (E-CSCF).

Embodiments contemplate that the first device may receive the message from a third device which may include a proxy call session control function (P-CSCF). The P-CSCF may receive the message from a wireless transmit/receive unit (WTRU). Embodiments contemplate that the WTRU may be operated within a jurisdiction of the communication network. Alternatively or additionally, at 1806, the first device may be further configured to establish at least one communication connection with the E-CSCF. Embodiments contemplate that the message may be forwarded to the E-CSCF via the at least one communication connection. Alternatively or additionally, at 1808, the first device may be further configured to determine if at least a part of the message requires translation. Alternatively or additionally, at 1810, the first device may be further configured to route the message to an application server (AS) upon the determination indicating that at least a part of the message may requires translation. Embodiments contemplate that the AS may perform the translation. Alternatively or additionally, embodiments contemplate that the first device may receive the message from a third device which may include an application server (AS).

Alternatively or additionally, embodiments contemplate that a first device may include an emergency call session control function (E-CSCF) and may be in communication with a communication network. Embodiments contemplate that the first device may receive a message indicative of an emergency and may forward the message to a second device. Embodiments contemplate that the second device may include an interconnection border control function (IBCF) and that the second device may be in communication with the communication network. Embodiments also contemplate that the first device may receive the message from a third device that may include a serving call session control function (S-CSCF). Embodiments contemplate that the message may be initiated from a wireless transmit/receive unit (WTRU), and that the WTRU may be operated in a visited communication network outside a jurisdiction of the communication network. Embodiments further contemplate that the second device may also be in communication with the visited communication network.

Figure 19:
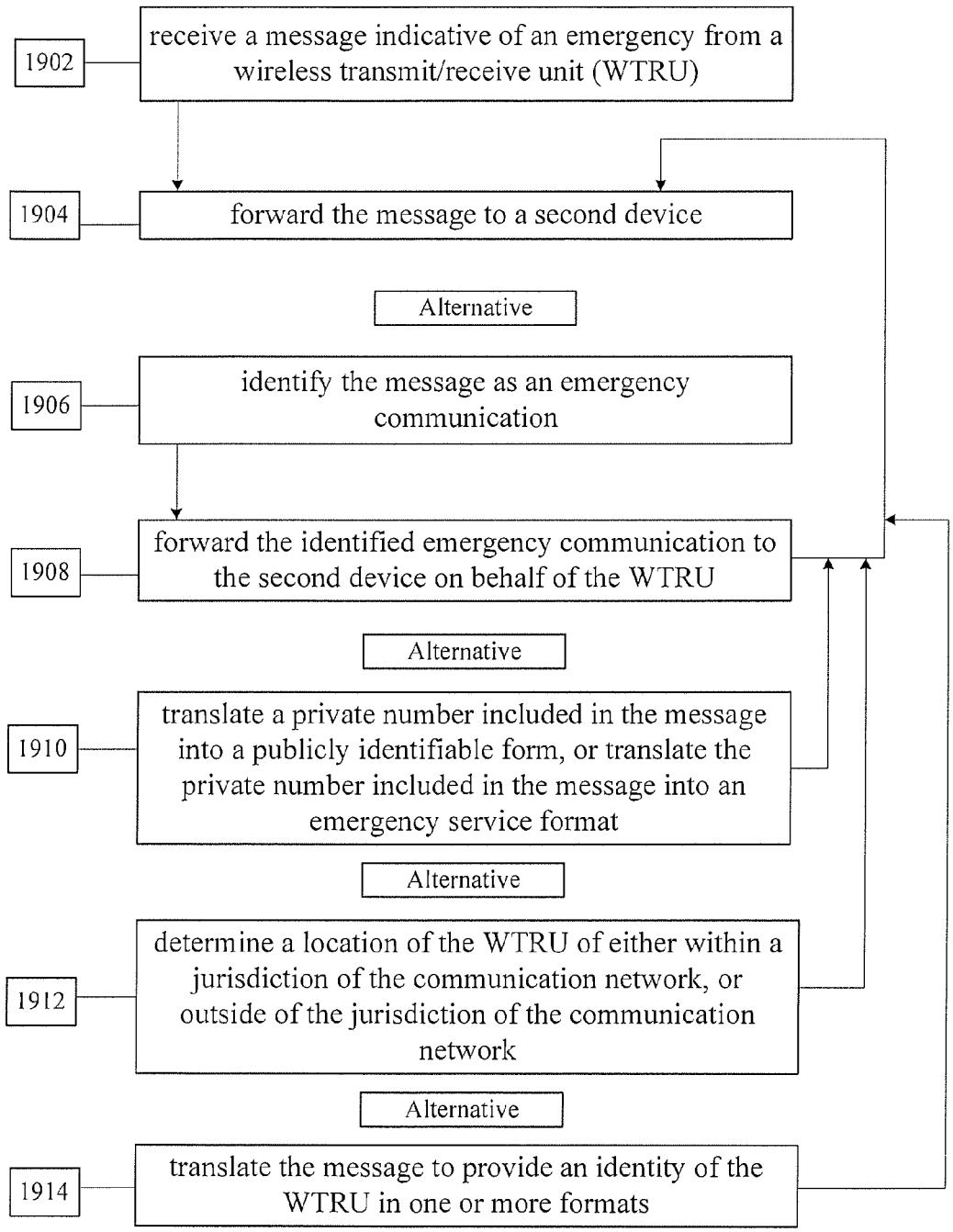
FIG. 19 illustrates a flow diagram of additional call flow exemplary embodiments.

Referring to FIG. 19, embodiments contemplate a first device that may be in communication with a communication network and may include an application server (AS). The first device may be configured, at least in part, at 1902, to receive a message indicative of an emergency from a wireless transmit/receive unit (WTRU) and, at 1904, to forward the message to a second device. Embodiments contemplate that the second device may be in communication with the communication network. At 1906, the first device may be further configured to identify the message as an emergency communication. At 1908, the first device may be further configured to forward the identified emergency communication to the second device on behalf of the WTRU.

Embodiments contemplate that the emergency communication may include a private number and, at 1910, the first device may be further configured to, at least one of: translate the private number included in the message into a publicly identifiable form, or translate the private number included in the message into an emergency service format. At 1912, the first device may be further configured to determine a location of the WTRU. Embodiments contemplate that the location may be within a jurisdiction of the communication network, or may be outside of the jurisdiction of the communication network.

Embodiments contemplate that the determined location of the WTRU may be within the jurisdiction of the communication network. At 1914, the first device may be further configured to translate the message to provide an identity of the WTRU in one or more formats. Embodiments contemplate that the second device may include a proxy call session control function (P-CSCF), and that the second device may forward the emergency communication toward a public safety access point (PSAP).

Embodiments also contemplate one or more methods that may be performed by a first device, the first device may be in communication with a communication network. The method may comprise receiving a message indicative of an emergency, and forwarding the message to a second device. Embodiments contemplate that the second device may be in communication with the communication network and the first device may include a serving call session control function (S-CSCF) and the second device may include an emergency call session control function (E-CSCF).

Alternatively or additionally, the first device may receive the message from a third device, and the third device may includes a proxy call session control function (P-CSCF). The P-CSCF may receive the message from a wireless transmit/receive unit (WTRU). The method may further comprise determining a location of the WTRU, where the location may be within a jurisdiction of the communication network, or outside of the jurisdiction of the communication network. Alternatively or additionally, the WTRU may be determined to be operated within a jurisdiction of the communication network, and the method may further comprise establishing at least one communication connection with the E-CSCF, and forwarding the message to the E-CSCF via the at least one communication connection.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

While the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed is:

1. A first device, the first device including a serving call session control function (S-CSCF) and the first device in communication with a communication network, the first device configured, at least in part, to:

receive a message indicative of an emergency from a second device, the second device including a proxy call session control function (P-CSCF), the message originated by a user from a wireless transmit/receive unit (WTRU) being operated within a jurisdiction of the communication network, the P-CSCF receiving the message from the WTRU;

forward the message to a third device, the third device including an emergency call session control function (E-CSCF) and the third device in communication with the communication network;

determine if at least a part of the message requires translation; and translate the message to at least produce a publically identifiable form of a private number included in the message, the publically identifiable form of the private number providing a public identity of the WTRU, and to produce information about the user based on the private number.

2. The first device of claim 1, wherein the first device is further configured to establish at least one communication connection with the E-CSCF, the message forwarded to the E-CSCF via the at least one communication connection.

3. The first device of claim 1, wherein the first device is further configured to route the message to an application server (AS) upon the determination indicating at least a part of the message requires translation.

4. A first device, the first device in communication with a communication network, the first device including an application server (AS), and the first device configured, at least in part, to:

receive a message indicative of an emergency, the message forwarded from a second device, the second device including a proxy call session control function (P-CSCF), the message originated by a user from a wireless transmit/receive unit (WTRU) being operated within a jurisdiction of the communication network, the P-CSCF receiving the message from the WTRU;

identify the message as an emergency communication;

determine a requirement for translation of the identified emergency communication;

forward the identified emergency communication to a third device, the third device in communication with the communication network; and translate the message to at least produce a publically identifiable form of a private number included in the message, the publically identifiable form of the private number providing a public identity of the WTRU, and to produce information about the user based on the private number.

5. The first device of claim 4, wherein the third device includes a serving call session control function (S-CSCF), the third device forwarding the emergency communication toward a public safety access point (PSAP).

6. A method performed by a first device, the first device in communication with a communication network, the method comprising:

receiving a message indicative of an emergency from a second device, the second device including a proxy call session control function (P-CSCF), the message originated by a user from a wireless transmit/receive unit (WTRU) being operated within a jurisdiction of the communication network, the P-CSCF receiving the message from the WTRU;

forwarding the message to a third device, the third device in communication with the communication network, wherein the first device includes a serving call session control function (S-CSCF) and the third device includes an emergency call session control function (E-CSCF);

determining if at least a part of the message requires translation;

translating the message to at least produce a publically identifiable form of a private number included in the message, the publically identifiable form of the private number providing a public identity of the WTRU, and to produce information about the user based on the private number;

establishing at least one communication connection with the E-CSCF; and forwarding the message to the E-CSCF via the at least one communication connection.

* * * * *